United States Patent [19]
Pajitnov et al.

[11] Patent Number: 6,102,796
[45] Date of Patent: Aug. 15, 2000

[54] SYSTEM AND METHOD FOR COMPOSING AN IMAGE WITH FRAGMENTS

[75] Inventors: Alexey L. Pajitnov, Clyde Hill; Corey C. Dangel, Seattle, both of Wash.

[73] Assignee: Microsoft Corporation, Redmond, Wash.

[21] Appl. No.: 09/060,157

[22] Filed: Apr. 14, 1998

Related U.S. Application Data

[63] Continuation-in-part of application No. 08/840,499, Apr. 21, 1997, Pat. No. 5,944,605.

[51] Int. Cl.[7] ...................................................... A63F 9/06
[52] U.S. Cl. ...................... 463/9; 273/153 R; 273/157 R; 463/1
[58] Field of Search ................. 463/9, 1, 31; 273/153 R, 273/156, 157 R

[56] References Cited

U.S. PATENT DOCUMENTS

| | | |
|---|---|---|
| 5,296,845 | 3/1994 | Haller . |
| 5,483,261 | 1/1996 | Yasutake . |
| 5,558,339 | 9/1996 | Perlman . |
| 5,577,185 | 11/1996 | Tunnell et al. . |
| 5,605,332 | 2/1997 | Harnett . |
| 5,619,830 | 4/1997 | Osborn . |
| 5,643,084 | 7/1997 | Mirsky . |
| 5,722,657 | 3/1998 | Cabrera . |
| 5,768,382 | 6/1998 | Schneier et al. . |
| 5,779,549 | 7/1998 | Walker et al. . |
| 5,944,605 | 8/1999 | Pajitnov ....................................... 463/9 |

*Primary Examiner*—Jessica J. Harrison
*Assistant Examiner*—Sheila Clayton
*Attorney, Agent, or Firm*—Jones & Askew, LLP

[57] ABSTRACT

Composing an image with fragments. The fragments of an image are downloaded from a server. The fragments are displayed in an initial configuration within the image. One of the fragments located at one of the positions within the image is then selected. The selected fragment is then moved to a second position within the image which has defined characteristics. The selected fragment is then visually altered to conform to the defined characteristics of the second position. The visual alteration may include altering the size or the aspect ratio or both of the fragments to conform to the defined characteristics of the respective positions, such as a positions within a grid, or altering the size or orientation or both of the fragments to conform to the defined characteristics of their respective positions, such as C-shaped fragments arranged radially around a center of the image. After the appearance of the selected fragment is altered, a new configuration of the image fragments may be displayed. A determination may also be made to determine whether the new configuration of the fragments correctly represents the image. If the new configuration does not correctly represent the image, then another fragment may be selected and the above process may be repeated. However, if the new configuration correctly represents the image, a timestamp may be uploaded to the server. In response to the timestamp, a score may then be downloaded from the server.

69 Claims, 15 Drawing Sheets

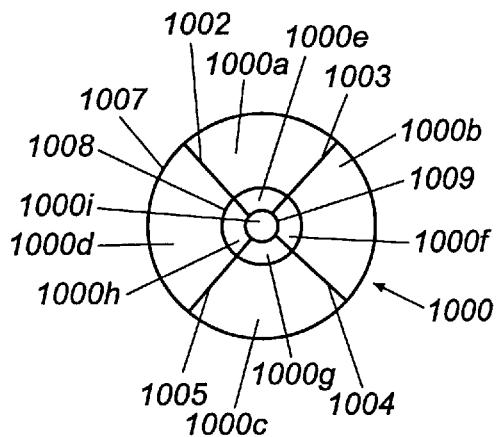
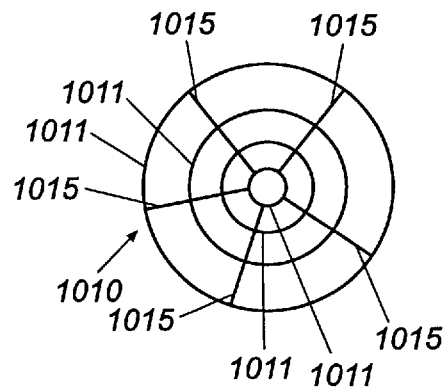
Fig. 10A    Fig. 10B
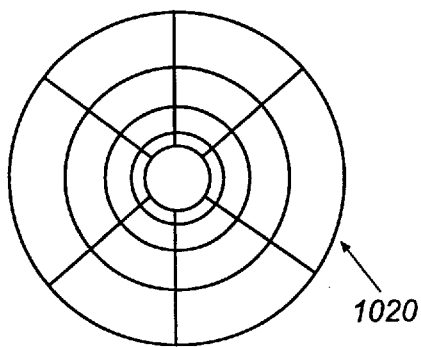
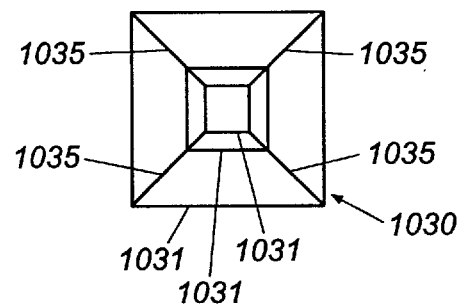
Fig. 10C    Fig. 10D

6,102,796

SYSTEM AND METHOD FOR COMPOSING AN IMAGE WITH FRAGMENTS

CROSS REFERENCE TO RELATED APPLICATIONS

This application is a continuation-in-part of application Ser. No. 08/840,499 filed on Apr. 21, 1997, now U.S. Pat. No. 5,944,605.

TECHNICAL FIELD

This invention generally relates to graphical puzzles and, more particularly, relates to composing an image having image fragments. Even more particularly, this invention relates to composing an image having image fragments which are visually altered to conform to the size, shape, aspect ratio, or orientation of positions within the image.

BACKGROUND OF THE INVENTION

"Compose the picture" puzzles, such as jigsaw puzzles, have long been some of the most popular types of puzzles. These puzzles traditionally involve cutting an image into pieces and then randomly mixing them. The puzzle is solved when the player has positioned the pieces so that the original image is reconstructed. These types of puzzles can be implemented in a paper or board format as well as on the computer.

In one computerized implementation of a "compose the picture" puzzle, the player repeatedly swaps the position of two pieces until the image is accurately represented to the player. When the two pieces are swapped, the computer is able to display a new configuration of the pieces to the player.

In another computerized implementation of the "compose the picture" puzzle, a single piece is left out so that a piece may be shifted to an empty position. The player repeatedly shifts different pieces of the puzzle into the position left empty until the image is accurately represented to the player.

Successful image puzzles rely on an appropriate "discovery factor." The discovery factor is the point in time when a seemingly chaotic group of puzzle pieces becomes recognizable as the target image. In standard analog image puzzles, jigsaw puzzles for instance, the discovery factor is effected by a number of play variables: image content, orientation, position, and the number of puzzle pieces. Computer puzzles may introduce play variables which are impossible to modify in the analog world, such as aspect ratio and scale. These play variables must be properly balanced when implementing a "compose the picture" puzzle on a computer so that the puzzle is not too easy, nor too difficult to solve. Mismanagement of the play variables in computer-based "compose the picture" puzzles can also result in an obscured discovery factor and a frustrating play experience. For instance, altering both the scale and the orientation of the puzzle pieces may lead to a puzzle which is frustrating to play. Previous computer-based "compose the picture" puzzles have, therefore, not permitted the altering of both of these play variables. Moreover, because previous computer-based "compose the picture" puzzles have not permitted altering the orientation of the puzzle pieces, they have not permitted solution of the puzzle in any orientation other than the initial one. There is, therefore, a need for a computer-based "compose the picture" puzzle which uses both scale and orientation as play variables, but which provides an appropriate discovery factor and permits solution of the puzzle in a multitude of orientations.

Computer-based "compose the picture" puzzles must also be solvable more quickly than analog puzzles. Computer-based puzzle players are simply unwilling to sit in front of a computer arranging a puzzle for hours on end like they might with a traditional jigsaw puzzle. Players may also not have a long period of time to spend playing the puzzle in order to reach a solution. This need to shorten the time for recognition and completion of the puzzle is especially necessary in the realm of on-line gaming. In on-line gaming, games may be played over networks such as the Internet and the World Wide Web. Play time, therefore, must be minimized to keep the player interested and to reduce on-line charges and computing resources. One way of accomplishing this is to reduce the number of puzzle pieces. Too few pieces, however, often results in a puzzle which is too easily solved. The need to shorten playing time, therefore, must be carefully balanced with the need to maintain an adequate level of challenge and pleasure for the player.

There is, therefore, a need for a system for composing an image within a computerized "compose the picture" puzzle (1) which can be solved in a relatively short period of time while still providing an intriguing challenge to the player, (2) which is visually stimulating for the player, (3) which manipulates both scale and orientation of the image fragments without obscuring the discovery factor, (4) which allows the puzzle to be solved in multiple orientations, (5) which allows the player to recognize the visually distorted image fragments, and (6) which can be played with just a few pieces while still providing a challenging play experience.

SUMMARY OF THE PRESENT INVENTION

The present invention is directed to a method and system for composing an image in which are defined a plurality of non-uniform fragments at predetermined positions within the image. The present invention satisfies the above needs by providing a method and system for composing an image which provides a visually stimulating and logically challenging play experience even with just a few image fragments, but which may be solved in relatively short amount of time. The present invention also satisfies the above needs by providing a method and system for composing an image which alters the size and orientation of the image fragments and which permits the image to be composed in a plurality of orientations. Moreover, through the method and system of the present invention, the player is able to recognize image fragments even after the fragments have been altered, thereby encouraging the discovery factor.

Generally described, the present invention provides a method, a system, and a computer-readable medium on which is stored a computer program, for composing an image in which are defined a plurality of non-uniform fragments at predetermined positions within the image. The fragments are displayed in an initial configuration within the image. One of the fragments located at one of the positions within the image is then selected. The selected fragment is then moved to a second position within the image which has defined characteristics. The appearance of the selected fragment is then altered to conform to the defined characteristics of the second position.

In one embodiment of the present invention, the image is composed of a plurality of non-uniform fragments at predetermined positions within the image. A control module is used for moving image fragments and altering the appearance of fragments may be downloaded from a server computer system. The fragments themselves may also be downloaded from the server computer system. After they have been downloaded, the fragments may be shuffled between the positions and visually altered or distorted to conform to the defined characteristics of their respective positions within the image. The visual alteration may include altering the size or the aspect ratio or both of the fragments to conform to the defined characteristics of the respective positions, or altering the size or orientation or both of the fragments to conform to the defined characteristics of their respective positions. It is in this manner that the initial configuration of the image is created.

Once created, the initial configuration of the fragments is displayed. One of the image fragments located within one of the positions in the image may be selected. The selected fragment may then be moved to a second of the positions within the image. The appearance of the selected fragment may then be altered to conform to the defined characteristics of the second position. The visual alteration may include altering the size or the aspect ratio or both of the selected fragment to conform to the defined characteristics of the second position, or altering the size or orientation or both of the selected fragment to conform to the defined characteristics of the second position.

After the appearance of the selected fragment is altered, a new configuration of the image fragments may be displayed. A determination may also be made to determine whether the new configuration of the fragments correctly represents the image. If the new configuration does not correctly represent the image, then another fragment may be selected and the above process may be repeated. However, if the new configuration correctly represents the image, a timestamp may be uploaded to the server. Typically, the timestamp represents the time it took to accurately compose the image. A score, more generally called a completion ranking, may then be downloaded from the server. The score generally depends on the elapsed time it took to accurately compose the image and a level of difficulty associated with the computerize puzzle.

In another embodiment of the present invention, the image is divided into fragments according to a playing grid. The grid is defined by various non-uniformly sized positions or cells. In playing a computerized puzzle where a player has to compose or reconstruct the image from the fragments, the fragments are selected and moved within the grid. The appearance of these selected and moved fragments are then visually distorted or altered in order to reconstruct or compose the image from the fragments.

In this embodiment of the present invention, the initial configuration of the fragments is displayed within the grid. The initial configuration of fragments may be created by shuffling the fragments between positions within the grid. After shuffling the positions, the appearance of each fragment may be altered to conform to the characteristics of its respective position within the grid. In this manner, the fragments may be placed in their initial configuration and then displayed.

After the initial configuration is displayed, one of the fragments is selected. This selected fragment is located at one of the positions within the grid. The selected fragment is moved to a second position within the grid. The second position has defined characteristics, such as a defined size, shape, and aspect ratio. Once the selected fragment is moved, the appearance of the selected fragment is altered to conform to the defined characteristics of the second position. In this second embodiment, the appearance of the selected fragment is altered by horizontally and vertically stretching and shrinking the size and the aspect ratio of the selected fragment. In this way, the image is composed or reconstructed from the fragments of the image by selecting, moving and altering the appearance of the fragment within the grid.

Altering the appearance of a fragment to conform to its grid position is advantageous because it allows the use of non-uniformly sized and non-uniformly shaped positions within the grid. Furthermore, altering the appearance of the fragments is visually challenging for a player attempting to compose the image from the fragments. Additionally, using such a grid and altering the appearance of the fragments as they are moved within the grid provides an adequate challenge to the player while allowing the image to be composed within a relatively short period of time.

After the selected fragment is altered, the fragments are in a new configuration of appearances and positions. This new configuration of fragments may be displayed within the grid. Additionally, a determination may be made regarding whether the new configuration of fragments correctly represents the image. If the new configuration of the fragments does not correctly represent the image, then another fragment may be selected and the above-described steps may be repeated.

In this embodiment, the initial configuration of fragments is displayed within cells of the grid. Prior to displaying the initial configuration, a control module, the fragments, and the grid may be downloaded from the server. Once downloaded, each of the fragments may be individually assigned to each of the grid cells. After assigning the cells to the fragments, the appearance of each fragment may be altered to conform to the characteristics of its respectively assigned cell within the grid. In this manner, the appearances and cell assignments of the fragments form the initial configuration of the fragments. The initial configuration of fragments may advantageously allow a player to interpret the altered and distorted fragments and possibly recognize the image.

After displaying the initial configuration of fragments, a first fragment is selected. The first fragment is located within a first cell of the grid. Next, a new cell within the grid is selected as a desired location for the first fragment. Prior to selection, the new cell contains a second fragment. The first fragment is moved to the new cell and, in a swapping manner, the second fragment is moved to the first cell. The appearance of the first fragment is then altered to conform to defined characteristics of the new cell. The defined characteristics of the new cell may include the size, shape, and aspect ratio of the new cell. Similarly, the appearance of the second fragment is altered to conform to predetermined characteristics of the first cell. The predetermined characteristics may include the size, shape, and aspect ratio of the first cell. In this way, the image is composed or reconstructed from the fragments of the image by effectively swapping the positions of two fragments and altering their respective appearances within the grid.

After the second fragment is altered, the fragments are in a new configuration. This new configuration of fragments may be displayed within the grid. A determination may be made regarding whether the new configuration of fragments correctly represents the image. If the new configuration of the fragments does not correctly represent the image, then another two fragments may be swapped and the above-described steps may be repeated. However, if the new configuration correctly represents the image a timestamp may be uploaded to the server and a score may be downloaded from the server.

In yet another embodiment of the present invention, the image is composed of a plurality of outer fragments at predetermined positions around a center of the image. Each of the fragments may be similarly shaped. The positions may be four-sided figures having a pair of straight sides along radii from the center of the image. The four-sided figures may be arranged in continuous bands around a center of the image and the image may be divided into the four-sided figures. The number of continuous bands may be varied, thereby making it easier or more difficult to compose the image. In this embodiment, there may also be a center fragment around which the four-sided figures, and therefore the continuous bands, are positioned.

A control module used for moving image fragments and altering the appearance of fragments may be downloaded from a server computer system. The fragments, the initial fragment positions, and the correct relative fragment positions may also be downloaded from the server computer system. The fragments may be assigned the initial fragment positions or they may be assigned initial positions by shuffling a plurality of fragments between the positions within the image. The appearance of each fragment may then be altered to conform to the defined characteristics of its respective position within the image, thereby creating an initial configuration of the fragments. In particular, the size or the orientation or both of the fragment may be altered to conform to the defined characteristics of its respective position within the image. The initial configuration of the fragments may then be displayed. In this embodiment, one of the fragments may be omitted prior to displaying the initial configuration of the fragments, thereby creating an initial empty position within the image.

One of the fragments located within one of the positions of the image may then be selected. The selected fragment may be limited to one of the fragments located at a position which is adjacent to the initial empty position. The selected fragment may then be moved to a second position within the image. The second position may be restricted to the initial empty position, thereby creating a new empty position when the selected fragment is moved into the initial empty position.

After the selected fragment is moved, the appearance of the selected fragment may be altered as required to conform to the defined characteristics of the second position. In particular, the size or orientation or both of the selected fragment may be altered to conform to the defined characteristics of the second position. The appearance of the center fragment may also be altered so that the center fragment has the same orientation with respect to the new empty position as it had to the initial empty position. The center fragment may, therefore, always be oriented toward the new empty position. The orientation of the selected fragment may also be preserved with respect to a radius.

Because the orientation of the fragments is maintained with respect to a radius, the image may be solved in a plurality of orientations. This is advantageous because it permits a visually stimulating, challenging puzzle to be created with only a few fragments. This is also advantageous because the player is able to recognize the image fragments which encourages the discovery factor and reduces the time necessary to compose the image.

After the appearance of the selected fragment is altered, the new configuration of the image fragments may be displayed. A determination may also be made to determine whether each fragment is in its correct position relative to the other fragments. If all of the fragments are not in their correct relative positions, then another fragment may be selected and the above process may be repeated. If the fragments are in their correct relative positions, then the omitted fragment may be displayed in the new empty position. Also, a timestamp may be uploaded to the server and a corresponding score may be downloaded from the server.

Therefore, in light of the above, it is an object of the present invention to provide a system and method for composing an image which can be solved in a relatively short period of time and which may contain only a few image fragments, while still providing an intriguing challenge to the player.

It is further an object of the present invention to provide a system and method for composing an image which is visually stimulating for the player but which allows the player to recognize the visually distorted image fragments.

It is further an object of the present invention to provide a system and method for composing an image which manipulates both scale and orientation of the image fragments without sacrificing playability.

That the present invention and the exemplary embodiments thereof overcome the problems and drawbacks as set forth above and accomplish the objects of the invention set forth herein will become apparent from the detailed description of the exemplary embodiments which follows.

BRIEF DESCRIPTION OF THE DRAWINGS

FIGS. 10A–10I are diagrams illustrating various possible arrangements of positions of image fragments in an embodiment of the present invention.

DETAILED DESCRIPTION OF THE PREFERRED EMBODIMENTS

Figure 1:
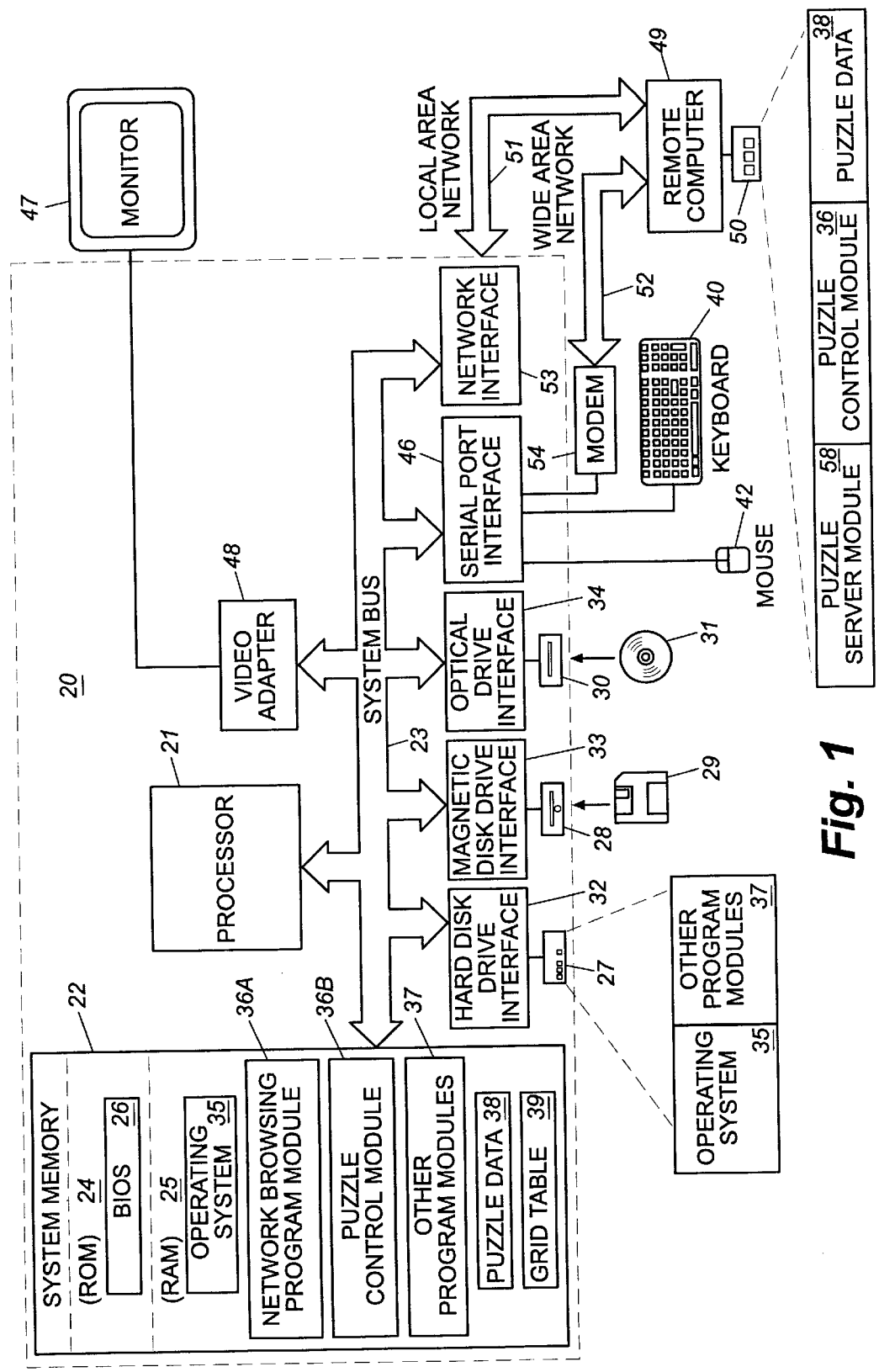
FIG. 1 is a block diagram of a personal computer that provides the operating environment for an embodiment of the present invention.

The present invention is directed to a system and method for composing an image from fragments of the image. In the embodiments of the present invention, the image is divided into fragments. An initial configuration of the fragments is displayed to the player after some or all of the fragments are shuffled. The player selects a fragment and moves it to a new position within the grid. As a result, the appearance of the moved fragment is adaptively altered to conform to the defined characteristics of the new position. This poses a stimulating visual challenge to the player because the fragment positions are non-uniform.

The embodiments of the present invention are represented by graphical puzzles, which are provided as part of the "MIND AEROBICS" content of the "MICROSOFT NETWORK" on-line data network developed by Microsoft Corporation of Redmond, Wash. Typically, a player connects to the "MICROSOFT NETWORK" on-line data network and then downloads control software for the particular puzzle from a server. Next, the player downloads the image fragments and the grid, which may alternatively be contained in the control software. The player may also download initial fragment positions and correct relative fragment positions. The fragments are then assigned the initial positions downloaded from the server or are shuffled within the grid. The fragments are then adaptively altered to visually conform to their respective positions within the grid. The shuffled and altered fragments are then initially displayed to the player. The player plays the puzzle by selecting and moving fragments to different positions within the puzzle grid. Upon moving a fragment, the control software alters the appearance of the moved fragment. The arrangement of the fragment positions and the ability to alter the appearance of image fragments when the fragments are moved within the puzzle playing grid is the focus of the present invention.

The detailed description which follows is represented largely in terms of processes and symbolic representations of operations by conventional computer. The processes and operations performed by the computer include the manipulation of signals by a processor and the maintenance of these signals within data structures resident in one or more memory storage devices. These symbolic representations are the means used by those skilled in the art of computer programming and computer construction to most effectively convey teachings and discoveries to others skilled in the art. For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, modules, messages, fragments, data, images, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as creating, connecting, comparing, moving, displaying, determining, uploading, downloading, selecting, playing, and the like, which may be associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and a suitable operating environment will be described.

THE EXEMPLARY OPERATING ENVIRONMENT

FIG. 1 and the following discussion are intended to provide a brief, general description of the suitable computing environment in which the invention may be implemented. While the invention will be described in the general context of an application program that runs on an operating system in conjunction with a personal computer, those skilled in the art will recognize that the invention may also be implemented in combination with other program modules. Generally, program modules include code, applets, routines, programs, components, objects, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

Referring now to FIG. 1, an exemplary system for implementing the present invention includes a conventional personal computer 20 (also referred to as a client computer), including a processor 21, a system memory 22, and a system bus 23 that couples the system memory 22 to the processor 21. The system memory 22 includes read only memory (ROM) 24 and random access memory (RAM) 25. A basic input/output system 26 (BIOS) is stored in ROM 24. The BIOS 26 essentially contains the basic routines that help to transfer information between elements within the personal computer 20 during certain computer operations, such as during start-up. The personal computer 20 further includes a hard disk drive 27, a magnetic disk drive 28 (e.g., that reads from and writes to a removable disk 29), and an optical disk drive 30 (e.g., that reads from a CD-ROM disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above includes the hard disk drive 27, a removable magnetic disk 29 and an optical disk 31, such as a CD, it should be appreciated by those skilled in the art that other types of media which are readable by a computer, such as magnetic cassettes, flash memory cards, digital video disks and tapes, Bernoulli cartridges, and the like, may also be used in the exemplary operating environment.

A number of program modules may be stored in the drives and RAM 25, such as an operating system 35 and a network browsing program module 36a. In general, the network browsing program module 36a is a tool used to interact with other computers over data networks, such as the Internet and the World Wide Web. The network browsing program module 36a is also a tool capable of using downloadable program modules, such as the puzzle control module 36b, in order to direct operation of the personal computer 20. The drives and RAM 25 may also store other program modules 37, and program data (such as puzzle data 38 and a grid table 39).

The operating system 35, in conjunction with the BIOS 26 and associated device drivers, provides the basic interface between the computer's hardware and software resources, the user, and program modules such as the network browsing software module 36a. A user may enter commands and information into the personal computer 20 through a keyboard 40 and an input or pointing device, such as a mouse 42. Other input devices (not shown) may include a microphone, a joystick, a game pad, a satellite dish, a scanner, or the like. These and other input devices are, often connected to the processor 21 through a serial port interface 46, such as a game port or a universal serial bus (USB). A monitor 47 or other type of display device is also connected to the system bus 23 via an interface, such as a video adapter 48. In addition to the monitor 47, personal computers typically include other peripheral output devices (not shown), such as printers and speakers.

The personal computer 20 may operate in a networked environment using logical connections to one or more remote programmable devices, such as a remote computer 49. The remote computer 49 may be a server, a router, a peer device, or other common network node. Typically, the remote computer 49 includes many or all of the elements described relative to the personal computer 20, although only a memory storage device 50 has been illustrated in FIG. 1. In an exemplary embodiment of the present invention, the remote computer's 49 memory storage device 50 contains data (such as the puzzle control module 36b and the puzzle data 37) which may be downloaded to the personal computer 20. The memory storage device 50 also contains program modules (such as the puzzle server module 58) which may be used by the remote computer 49 when communicating with the personal computer 20.

The logical connections depicted in FIG. 1 include a local area network (LAN) 51 and a wide area network (WAN) 52. Such networking environments are commonplace in offices, enterprise-wide computer networks, intranets and the global Internet.

When used in a LAN networking environment, the personal computer 20 is connected to the local network 51 through a network interface 53. When used in a WAN networking environment, the personal computer 20 typically includes a modem 54 or other means for establishing communications over the wide area network 52, such as the global Internet. The modem 54, which may be internal or external, is connected to the system bus via the serial port interface 46. In a networked environment, program modules depicted relative to the personal computer 20, or portions thereof, may be stored in the remote memory storage device 50. It will be appreciated that the network connections show are exemplary and other means of establishing a communications link between the personal computer 20 and the remote computer 49 may be used.

As discussed earlier, the preferred embodiments of the present invention are embodied in a puzzle control module 36b. The puzzle control module 36b essentially controls the previously discussed computerized puzzles. In the exemplary operating environment, the puzzle control module is used in conjunction with the network browsing program module 36a, which is supported by Microsoft Corporation's "WINDOWS 95" or "WINDOWS NT" operating systems. However, it should be understood that the invention can be implemented for use with other network browsing program modules and with other operating systems, such as Microsoft Corporation's "WINDOWS 3.1" operating system, IBM Corporation's "OS/2" and "AIX" operating systems, SunSoft's "SOLARIS" operating system used in workstations manufactured by Sun Microsystem, Hewlett-Packard's "HP-UX" and "RT-UX" operating systems, and the operating system used in "MACINTOSH" computers manufactured by Apple Computer, Inc.

From this brief description, it should be appreciated that operating systems, such as the "WINDOWS 95" and "WINDOWS NT" operating system, are quite complex and provide a wide variety of services that allow users and programs to utilize the resources available in the personal computer. Those skilled in the art will be familiar with operating systems and their various features. For more comprehensive information regarding the "WINDOWS 95" and "WINDOWS NT" operating system and its interaction with programs, the reader may refer to any of a variety of publications, including the "Win32 Programmer's Reference" and "Advanced Windows", both published by Microsoft Press.

Figure 5:
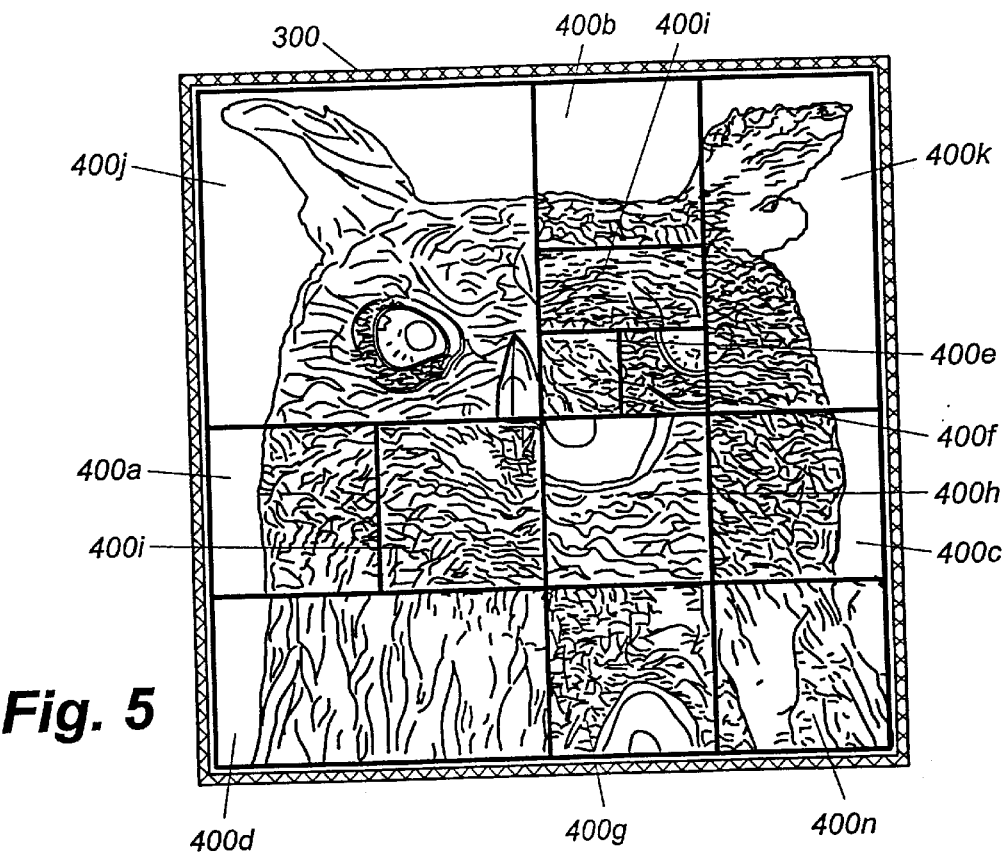
FIG. 5 is a diagram illustrating an intermediate configuration of the image fragments within the exemplary grid as the image is composed or reconstructed.
Figure 6:
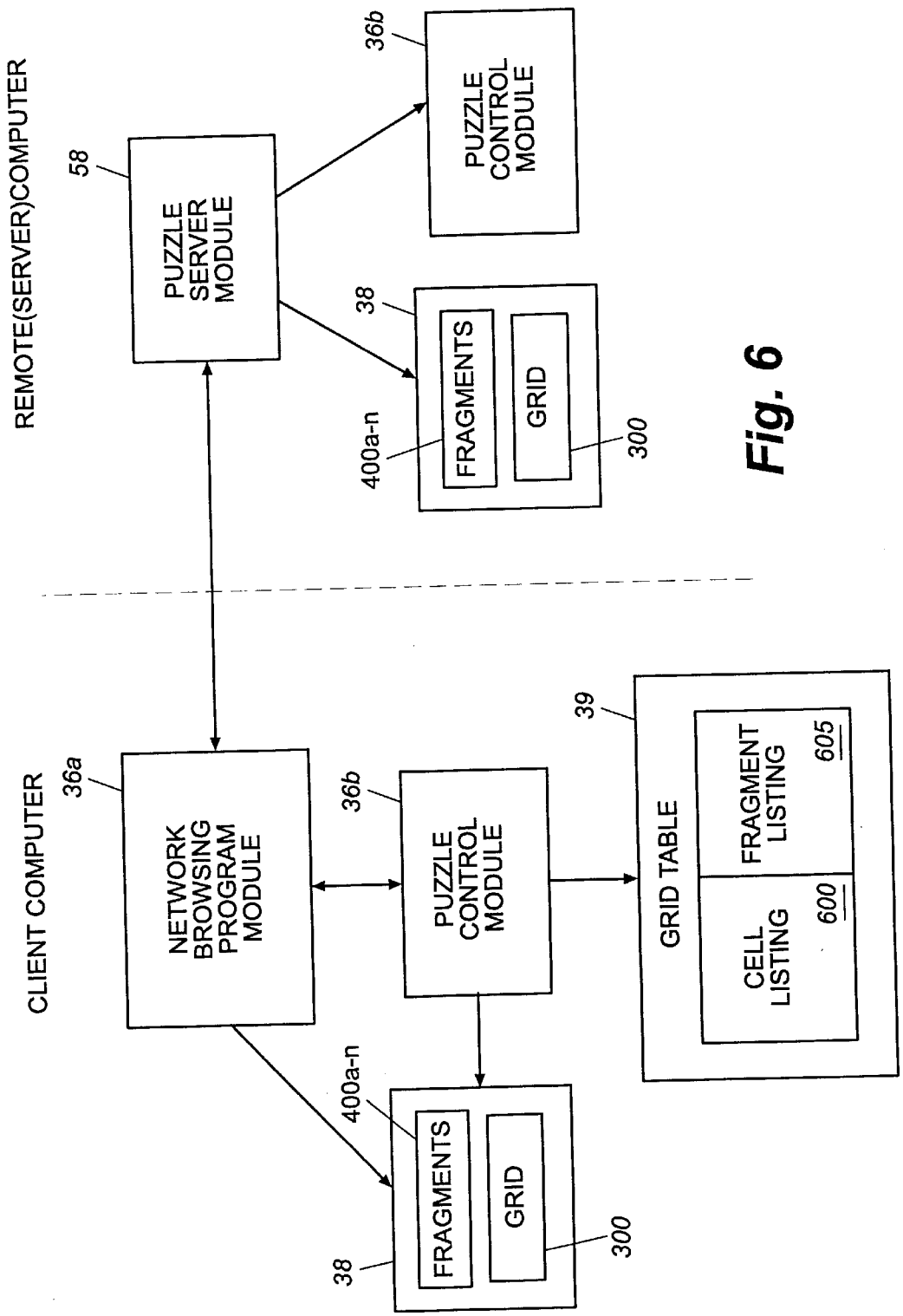
FIG. 6 is a diagram illustrating the relationships between a puzzle server module, a network browsing program module, a puzzle control module, puzzle data, and a grid table used by an embodiment of the present invention.

With the above preface on the exemplary operating environment for embodiments of the present invention, the remaining figures illustrate aspects of several embodiments of the present invention. In FIGS. 2–5, a first exemplary puzzle is illustrated from a player's perspective. This exemplary puzzle uses an image, fragments of the image, and a playing grid used to define the fragments of the image. In FIG. 6, the program modules used when playing the first exemplary puzzle are illustrated. FIGS. 7–8 are flow diagrams illustrating the preferred steps for composing an image when playing such a first exemplary puzzle. In FIG. 9, a second exemplary puzzle is illustrated from a player's perspective in several states of completion. This exemplary puzzle uses an image, fragments of the image, and C-shaped arc segments arranged around a center fragment as positions for the fragments. FIG. 10 illustrates alternative arrangements of the positions in the second embodiment of the present invention. In FIG. 11, the program modules used when playing the second exemplary puzzle are illustrated. FIG. 12 is a flow diagram illustrating the steps for composing an image when playing the second exemplary puzzle.

FIG. 13 illustrates several arrangements of fragment positions in a third embodiment of the present invention.

The exemplary embodiments of the present invention involve computerized types of "compose the picture" puzzles. In general, the puzzles involve composing an image from fragments of the image which have been rearranged and visually altered. In each of the embodiments, a player plays the puzzles by attempting to recreate the image. Essentially, the player changes the position of the fragments. Upon changing a fragment's position, the appearance of the fragment is visually altered to conform to its new position. In each embodiment, the player continues to change the position of the fragments until the puzzle is complete. The play of each of the puzzle embodiments from a player's perspective and the software modules required to implement these embodiments is discussed in detail below.

The First Puzzle Embodiment From a Player's Perspective

Figure 2:
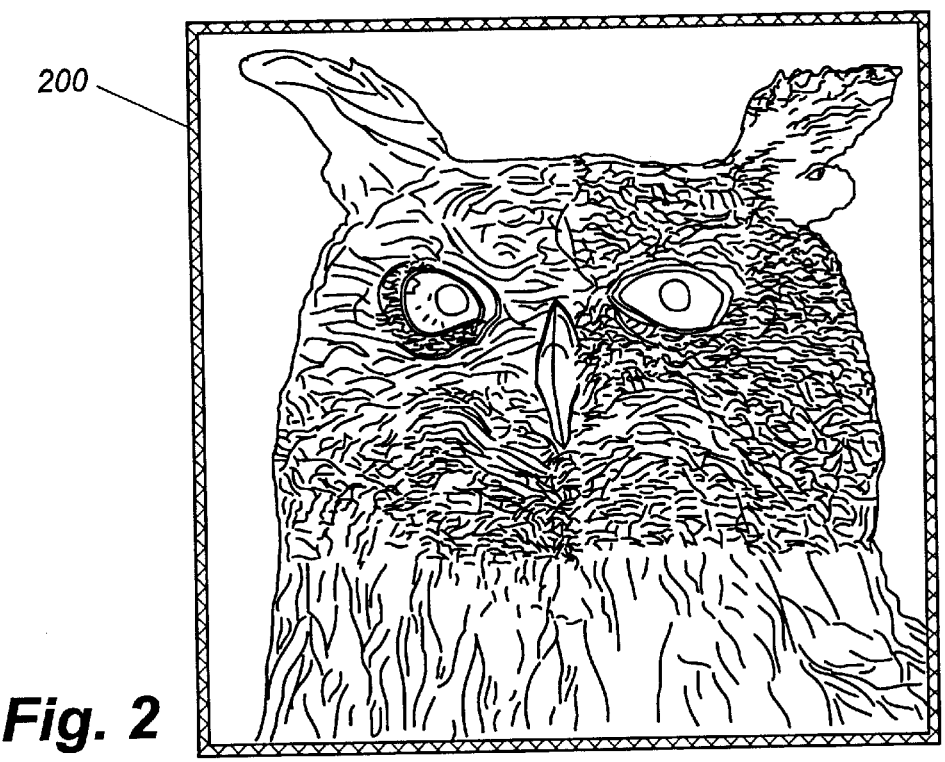
FIG. 2 is a diagram illustrating an exemplary image used by an embodiment of the present invention.

FIG. 2 is a diagram illustrating an exemplary image that may be used by the first puzzle embodiment. Referring now to FIG. 2, the image 200 is used as a basis for the individual puzzle. In this example, the exemplary image of the first embodiment 200 is a graphical representation of an owl. As will be discussed later in more detail, the image 200 is typically divided into distinct fragments of the image 200 according to a playing grid when the puzzle is initially created.

Figure 3:
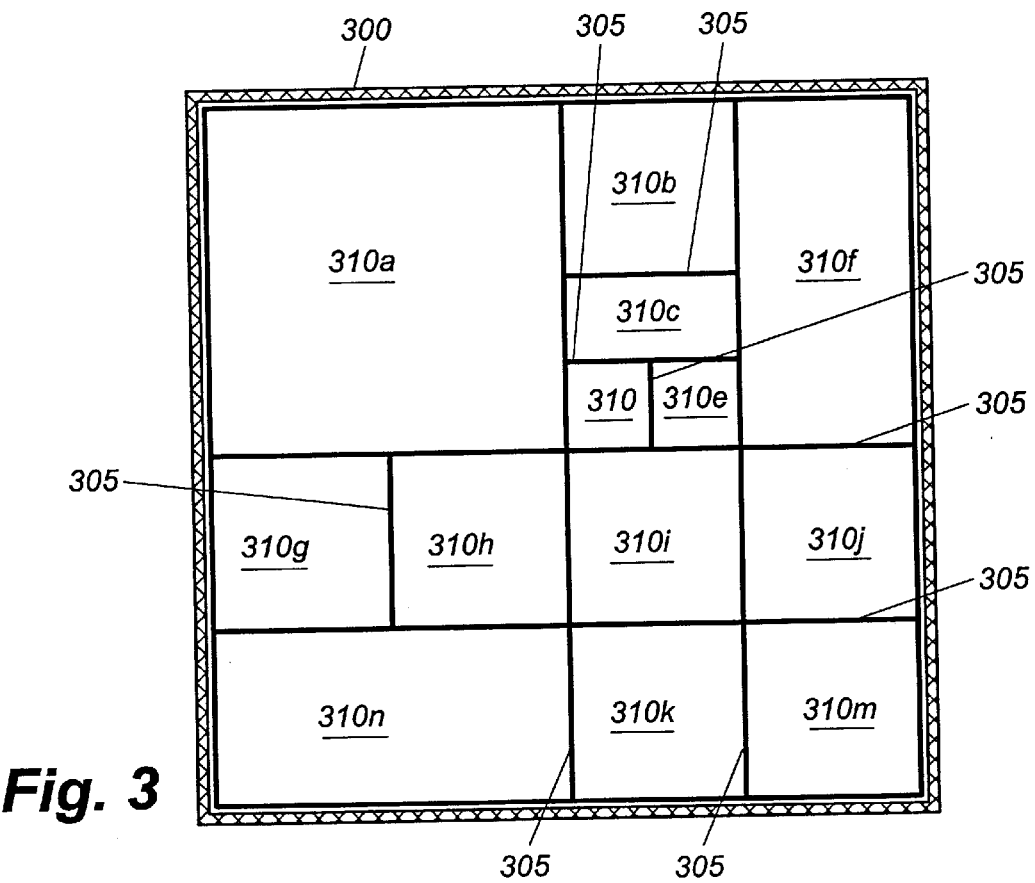
FIG. 3 is a diagram illustrating an exemplary grid used by an embodiment of the present invention.

FIG. 3 is a diagram illustrating an exemplary playing grid used by the first embodiment of the present invention. Referring now to FIGS. 2 and 3, the grid 300 must completely cover the image 200 to be used with the first embodiment of the present invention. Essentially, the grid 300 contains grid lines 305 which define non-uniformly sized positions or cells 310a–n within the grid 300. The grid 300 may be of any size in this embodiment of the present invention. Large grids increase the level of difficulty of a given puzzle. However, the grid 300 is generally kept as a 6×6 grid or smaller to maintain an adequate level of difficulty while avoiding too many grid positions or cells 310a–n.

Traditional "compose the picture" puzzles may use a grid having uniformly shaped cells. Uniformly shaped cells were usually required in such traditional puzzles in order to easily swap the positions of different pieces of the picture. The grid 300 used with the first embodiment of the present invention has cells 310a–n of a variety of non-uniform sizes and non-uniform aspect ratios. However, it is preferable to use cells 310a–n of a limited range of sizes and aspect ratios. The range of sizes and aspect ratios is preferably limited in order to avoid "pixelation" problems. A pixelation problem is when the appearance of a fragment within a cell is altered and distorted so much from its original appearance that a player begins to have trouble viewing the fragment. Accordingly, the range of sizes is preferably kept to an amount deemed appropriate, which will vary given the relative complexity of a given image 200.

Furthermore, the cells 310a–n may be of any shape in this embodiment of the present invention. However, the cells 310a–n are preferably square or rectangular in shape in this embodiment. This is because square or rectangular shaped cells provide a more normalized grid that allows players to focus on the graphics of the image 200, rather than the grid 300 itself.

By having cells of differing shape, size, and aspect ratio, the appearance of a fragment can be altered from its true and correct appearance to conform to the individual characteristics of the fragment's cell. It is contemplated that cells used with this embodiment of the present invention may also have a variety of shapes besides square shapes and rectangular shapes.

In the exemplary grid of the first embodiment 300 illustrated in FIG. 3, the grid 300 is described as a 4×4 grid normally consisting of sixteen 1×1 squares. Some of these squares are 1×1 cells 310b, 310g–310m within the grid 300. Others of the squares are joined together to form different sized cells, such as a 2×2 cell 310a, a 2×1 cell 310n, and a 1×2 cell 310f. Additionally, some of the squares may even be cut into smaller cells, such as a 1×0.5 cell 310c and a 0.5×0.5 cell 310d. In summary, the exemplary grid 300 includes cells 310a–n of seven different sizes. The sizes include three sizes of square-shaped cells and two sizes of two different types of "two square" rectangular-shaped cells. This grid 300 is then typically applied to the image 200 to divide the image 200 into distinct fragments or pieces in this embodiment.

Figure 4:
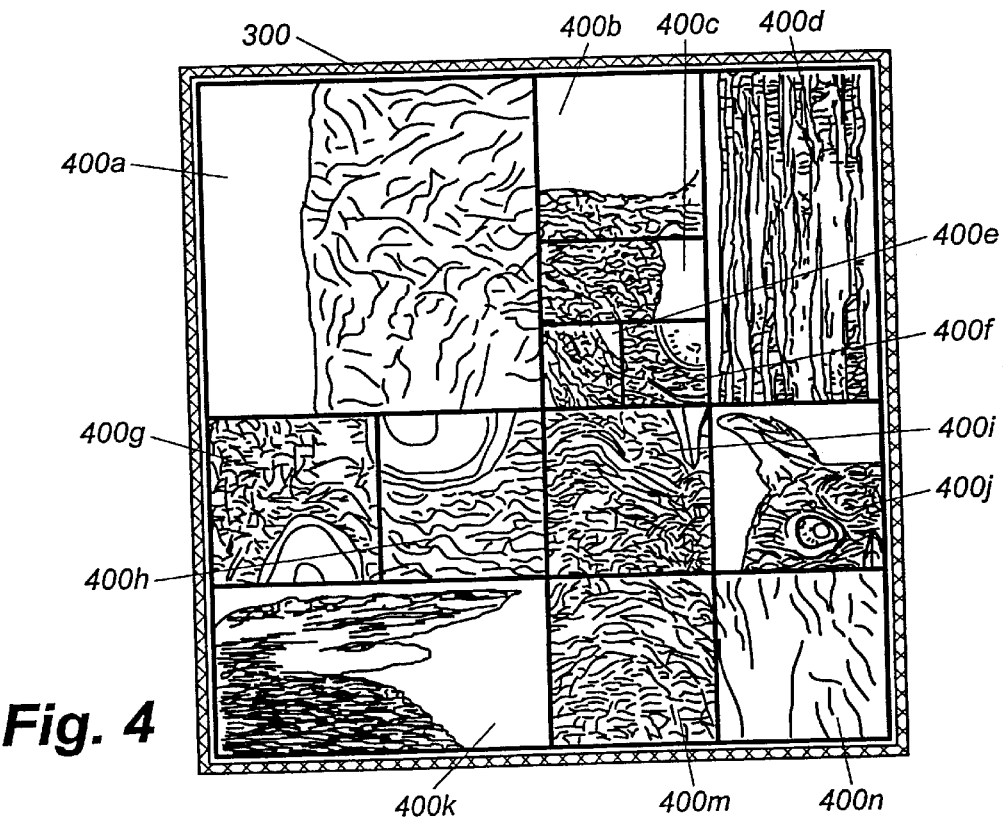
FIG. 4 is a diagram illustrating an initial configuration of image fragments within an exemplary grid where the appearance of the image fragments conform to their respective cells of the exemplary grid.

FIG. 4 is a diagram illustrating an initial configuration of image fragments within an exemplary grid of the first embodiment. Referring now to FIGS. 2–4, the appearance of fragments 400a–n of the image 200 conform to their respective cells 310a–n of the exemplary grid 300. As previously mentioned, the image 200 is divided into fragments 400a–n according to the cells 310a–n within the grid 300. However, the player does not see the image 200 at this point. The positions of the fragments 400a–n must be shuffled within the grid 300. After shuffling the fragments 400a–n into an initial configuration of the fragments 400a–n, the appearance of the fragments 400a–n is altered to conform to their new respective cells 310a–n. In other words, each fragment is stretched or shrunk independently in both the vertical and horizontal directions in order to fit into or conform to the characteristics of its new cell.

In the first embodiment, an image fragment is stretched and shrunk to conform to the characteristics of its cell using a standard graphics application programming interface function StretchBlt (). The StretchBlt () function stretches or compresses a bitmap image to fit the dimensions of a destination rectangle. In this way, the StretchBlt () function scales bitmap images, such as a fragment, based upon the dimensions of the destination rectangle, such as the new cell. One skilled in the art will be familiar with standard procedures for stretching or shrinking graphic images. Additional information regarding standard stretching and shrinking procedures, such as the StretchBlt() function, may be found by referring to either the Win32 Programmer's Reference published by Microsoft Press or "Graphic Gems III", a computer graphics reference book edited by David Kirk and published by Academic Press.

The aspect of altering the appearance of a fragment in order to fit within part of the puzzle grid is one of the main focuses of the present invention. Typically, the appearance includes the size of the fragment and the aspect ratio of the fragment. However, the appearance may also include the shape of the fragment. By conforming the fragments 400a–n to the cells 310a–n in this manner, there are no overlapping fragments 400a–n. Additionally, the alteration of the appearance of the fragments 400a–n allows for a puzzle with fewer fragments 400a–n while still posing a challenging level of difficulty for players when compared to traditional "compose the picture" puzzles.

Once the player begins to move fragments 400a–n within the grid 300, the player may begin to recognize the image 200. FIG. 5 is a diagram illustrating an intermediate configuration of the fragments 400a–n within the exemplary grid 300 as the image 200 is reconstructed. Referring now to FIGS. 2–5, when the player moves one of the fragments 400a–n to a new cell or position within the grid 300, the appearance of the fragment is altered to conform to the new cell.

In one example, an ear and eye of the owl are shown in one of the image fragments 400j. The player moved this fragment 400j of the image 200 from one position 310j (in FIG. 4) to a different position 310a (in FIG. 5) within the grid 300 in the player's efforts to correctly reconstruct the image 200. In response to moving the fragment 400j, the appearance of the fragment 400j is altered to conform to the characteristics of its new location, the upper left corner cell 310a. This example illustrates how the size of the fragment can be altered in order to fit its new cell.

In another example, two fragments have swapped positions within the grid 300. A first fragment 400k is a representation of the owl's other ear and is initially located in a 2×1 cell 310n (in FIG. 4). This fragment 400k is swapped with a second fragment 400d representing feathers on the neck of the owl, which is initially located in a 1×2 cell 310f (in FIG. 4). As a result of swapping the fragments, the first fragment 400k is now located within the 1×2 cell 310f (in FIG. 5) and the second fragment 400d is now located within the 2×1 cell 310n (in FIG. 5). In response to moving these fragments, the respective appearance of the fragments are altered to conform to the characteristics of their respective new cells. This example illustrates how the aspect ratio of a fragment is altered in order to fit its new cell in the first embodiment.

Essentially, the process of moving or swapping the position of fragments 400a–n within the grid 300 continues until the configuration of the fragments 400a–n correctly represent the image 200. When all of the fragments 400a–n correctly represent the image 200, the configuration of the fragments 400a–n looks like FIG. 2. Thus, from a player's perspective, the puzzle is played by composing the image using the fragments 400a–n and the grid 300.

Software Modules Used to Implement the First Puzzle Embodiment

Beyond the player's perspective, there are software modules which are used to implement the puzzles in the embodiments of the present invention. In these several embodiments, the puzzle is an on-line game. Exemplary software modules used to implement the first embodiment are discussed below.

FIG. 6 is a diagram illustrating the relationships between various software program modules in the first embodiment of the present invention. Referring now to FIGS. 1–6, the network browsing program module 36a is used to make a connection between the personal computer 20 and a server, such as the remote computer 49. The connection is typically made via the WAN 52, although other logical connections between the personal computer 20 and the server will suffice. In this way, the network browsing program module 36a communicates with the server.

In this embodiment of the present invention, a puzzle control module 36b is downloaded from the server to the personal computer 20. Essentially, the puzzle control module 36b is a program module that controls how a player interacts with the computerized puzzle. In one embodiment, the puzzle control module 36b is a downloadable plug-in program module or applet used in conjunction with the network browsing program module 36a. In the preferred embodiment, the puzzle control module 36b is a program module written to support the standard "ActiveX" network programming language developed by the Microsoft Corporation. Those skilled in the art will be familiar with applets for enhancing the functionality of the network browsing program module 36a. However, one skilled in the art will realize that a puzzle control module 36b is not limited to an applet implementation. In other embodiments of the present invention, the puzzle control module 36b could be a stand-alone program module instead of only a downloadable part of an on-line game.

Once the puzzle control module 36b is downloaded, the puzzle data 38 is downloaded from the server as well. The puzzle data 38 includes fragments 400a–n of an image 200 and a grid 300. An initial configuration of the fragments 400a–n is created by randomly shuffling the fragments 400a–n within positions or cells 310a–n of the grid 300. A grid table 39 is created in memory by the puzzle control module 36b to track and manage the relative assignments of the fragments 400a–n to the cells 310a–n within the grid 300. In one column 600 of the grid table 39 is a listing of cells 310a–n within the grid 300. In an adjacent column 605 of the grid table 39 is a corresponding listing of the fragments 400a–n. In this embodiment, the puzzle control module 36b is capable of randomly shuffling or re-assigning positions of the fragments 400a–n to cells 310a–n by changing the order of the listings 600, 605 within the grid table 39.

The player interacts with the personal computer 20 to play the puzzle. Essentially, inputs via the mouse 42 or the keyboard 40 are interpreted by the puzzle control module 36b when the player plays the on-line puzzle. When the configuration of the fragments 400a–n correctly represents the image 200, a timestamp message is sent or uploaded to the puzzle server module 58 on the server. The timestamp message contains a timestamp of an elapsed time it took the player to accurately compose the image 200 from the fragments 400a–n.

In response to receiving the timestamp message, the puzzle server module 58 generates a score or completion ranking for the player. The score is typically based upon the timestamp and the difficulty level of the particular puzzle. The score is then downloaded from the server to the network browsing program module 36a.

Figure 7A:
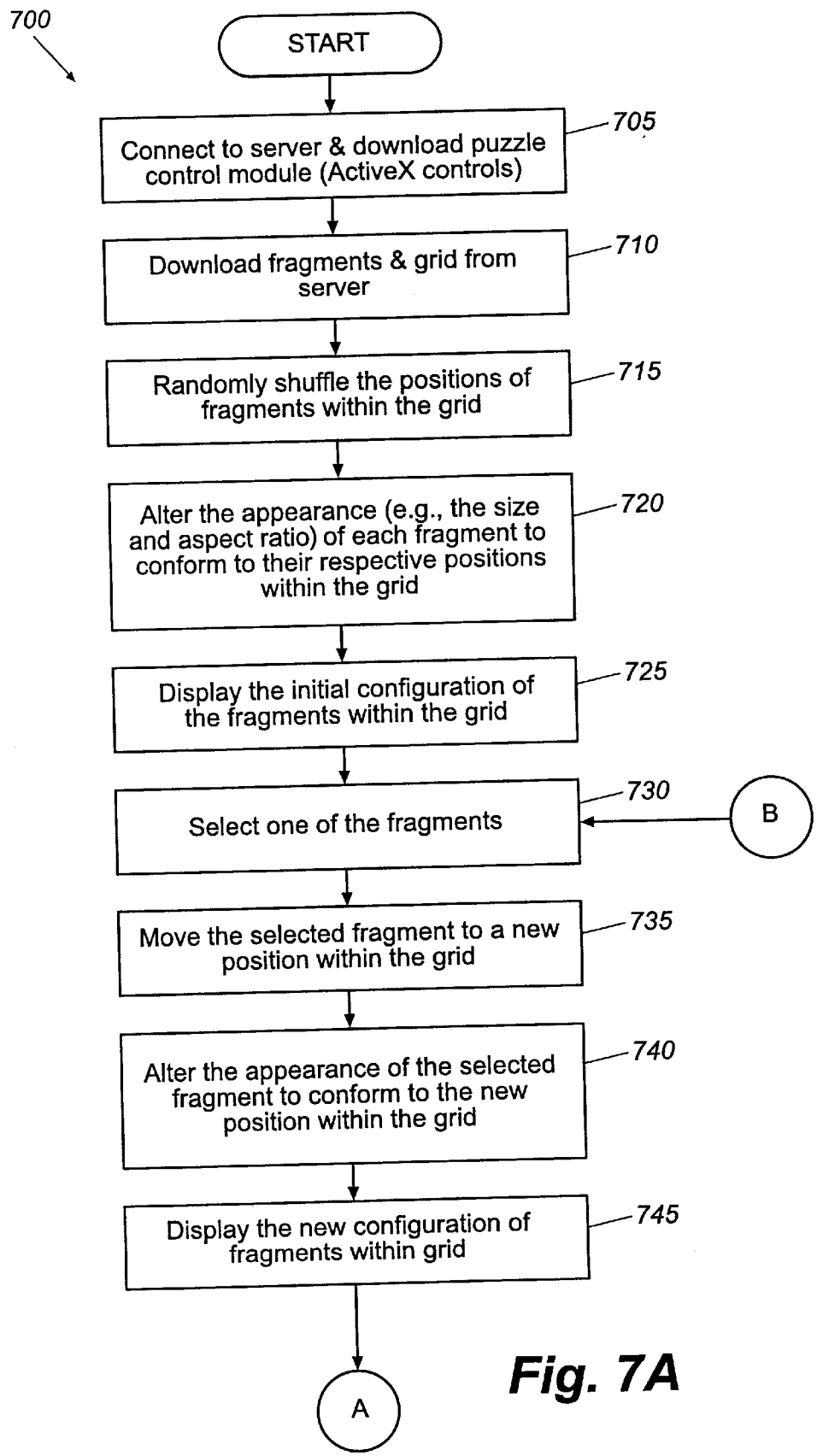
FIG. 7, consisting of FIGS. 7A–7B, is a flow diagram illustrating steps for composing an image from image fragments within a grid when a single image fragment is moved.
Figure 7B:
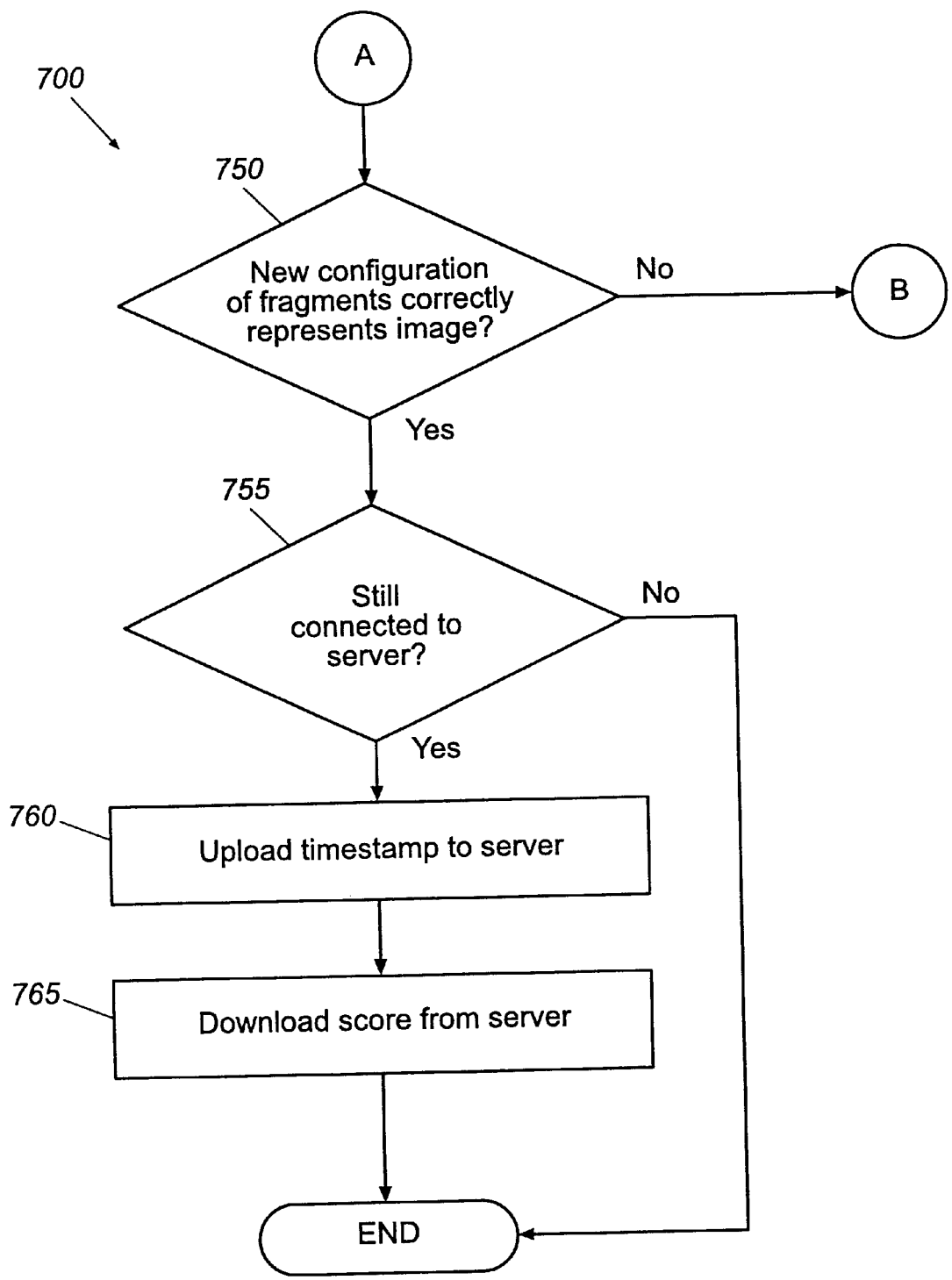
Figure 8A:
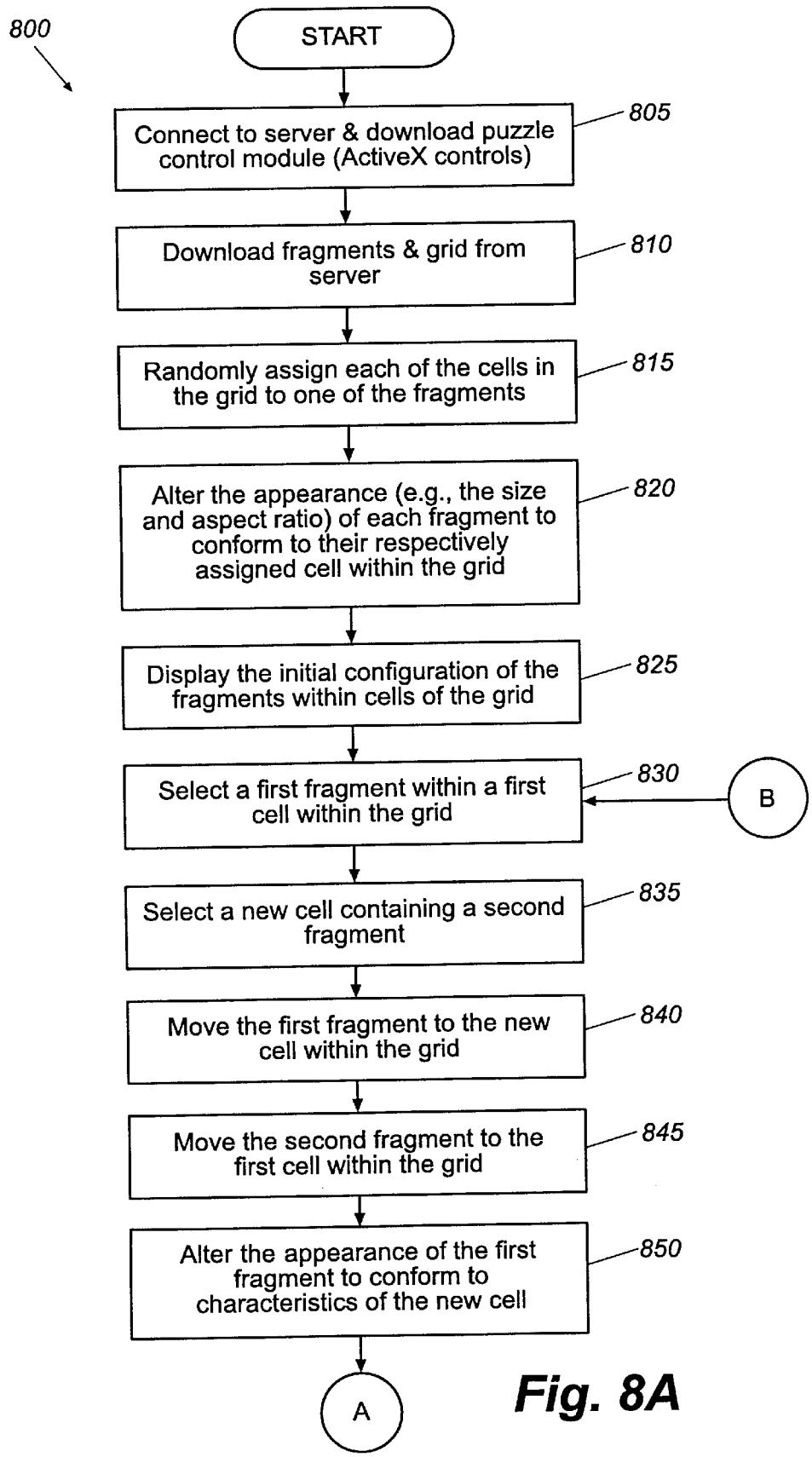
FIG. 8, consisting of FIGS. 8A–8B, is a flow diagram illustrating steps for composing an image from image fragments within a grid when the positions of two image fragments are swapped.
Figure 8B:
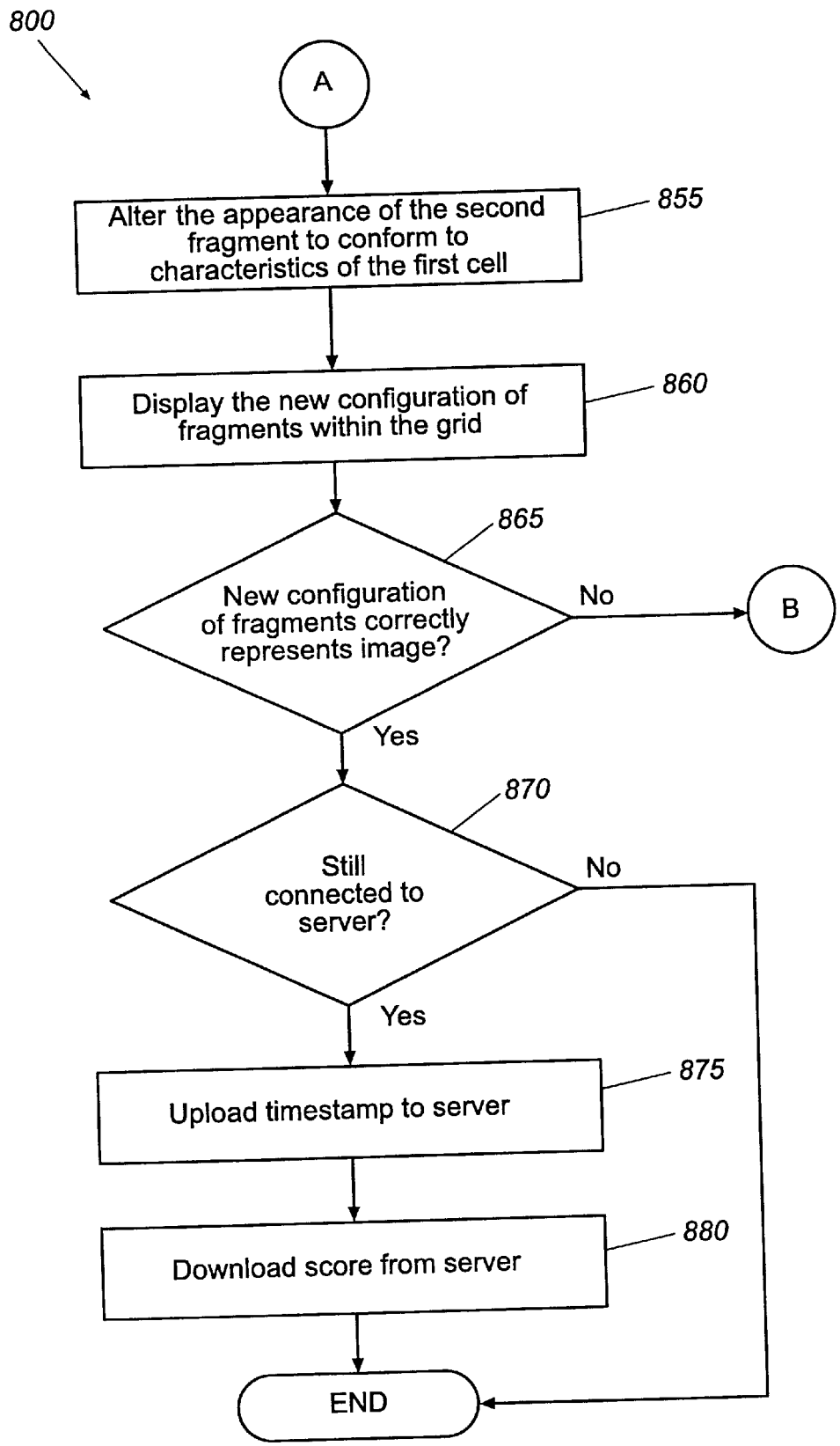

FIGS. 7 and 8 are flow diagrams supporting two versions of the first embodiment of the present invention for composing an image. Essentially, FIGS. 7A and 7B, collectively described as FIG. 7, support a version of the first embodiment where a single fragment is moved within the grid 300 and the fragment's appearance is altered to conform to characteristics of the fragment's new position within the grid. FIGS. 8A and 8B, collectively described as FIG. 8, support a version of the first embodiment where two distinct fragments are swapped in position and then the fragments' appearances are altered to conform to their respective new positions.

Referring now to FIGS. 1–7A, the method 700 begins at step 705 where the personal computer 20 is connected to the server (e.g., the remote computer 49), preferably using the network browsing program module 36a. Once connected to the server, a puzzle control module is downloaded. As previously mentioned, the puzzle control module 36b is preferably an applet written to support the standard ActiveX network programming language.

At step 710, image fragments and a grid for the puzzle (such as the fragments 400a–n and the exemplary grid 300) are also downloaded. At this step, the fragments are not yet shuffled.

At step 715, the positions of the fragments 400*a–n* are shuffled, preferably randomly, within the grid 300. After shuffling the fragments' positions, the appearance of each fragment is altered to conform to the characteristics of their respective positions within the grid 300 at step 720. This yields an initial configuration of the fragments 400*a–n*.

At step 725, the initial configuration of the fragments 400*a–n* is displayed within the grid 300, similar to the configuration illustrated in FIG. 4. This is the first time the puzzle is displayed to a player who must try to compose the image by moving the fragments 400*a–n* within the grid 300.

At step 730, one of the fragments 400*a–n* is selected and then moved to a new position within the grid 300 at step 735. When moving the selected fragment, the puzzle control module 36*b* preferably updates the grid table reflecting the changed assignment of fragments to positions within the grid 300.

Selection of a fragment and the new position for the fragment may be accomplished by using the mouse 42 or the keyboard 40. The player may use the mouse 42 to position a cursor on the monitor 47 above the desired fragment before clicking on the fragment to select it. Similarly, the new position for the fragment may be selected using the same clicking process. It is contemplated that selection and moving of a fragment to its new position may also be accomplished by using a conventional drag-and-drop control process.

Alternatively, the player may also use arrow keys on the keyboard 40 to position the cursor above the desired fragment. Selection of the fragment is implemented by pressing the spacebar key on the keyboard 40. Similarly, the new position for the selected fragment is selected and the selected fragment is then moved.

At step 740, the appearance of the selected and moved fragment is altered to conform to the characteristics of its new position within the grid 300. This yields a new configuration of the fragments 400*a–n*. At step 745, this new configuration is displayed to the player before proceeding to step 750 of FIG. 7B.

Referring now to FIGS. 1–7A, and 7B, if the new configuration of the fragments 400*a–n* does not correctly represent the original image 200 at step 750, then step 750 proceeds back to step 730. In this manner, the player continues to play the puzzle and attempts to compose the image 200.

However, if the new configuration of the fragments 400*a–n* correctly represents the original image 200 at step 750, then the process proceeds to step 755. At this point, the player has solved the puzzle by composing the image from the fragments 400*a–n* within the grid 300.

At step 755, if the personal computer 20 is still connected to the server, step 755 proceeds to step 760. If the personal computer 20 became disconnected from the server, the player would still be able to play the puzzle by performing steps 730–750. However, if the personal computer 20 is no longer connected to the server, the preferred method 700 terminates after step 755.

At step 760, the connection to the server is still operational and a timestamp message is uploaded to the server, preferably via the network browsing program module 36*a*. The timestamp message essentially contains a timestamp representing the player's elapsed playing time when correctly composing the image 200 (i.e., solving the puzzle). The puzzle server module 58 on the server receives the timestamp message and generates a score, typically based on the timestamp and the level of difficulty for the puzzle. At step 765, the score is downloaded back to the personal computer 20.

In summary, one aspect of the first embodiment of the present invention involves composing an image from image fragments within a grid when a single fragment is moved to a new position and the appearance of the moved fragment is altered to conform to characteristics of the new position.

Another aspect of the first embodiment present invention involves swapping the positions of two fragments within a grid. The appearance of each swapped fragment is altered to conform to its respective new position. As previously stated, FIGS. 8A and 8B support this other aspect of the present invention in the first embodiment.

Referring now to FIGS. 1–6, 7A, and 8A, the method 800 begins at step 805 where the personal computer 20 is connected to a server. Once connected to the server, a puzzle control module (preferably an applet written to support the standard ActiveX network programming language) is downloaded from the server.

At step 810, image fragments and a grid for the puzzle (such as the exemplary fragments 400*a–n* and the exemplary grid 300) are also downloaded. The grid 300 for the puzzle contains various non-uniformly sized cells 310*a–n* defined by grid lines 305 within the grid 300. The image fragments have not yet been assigned to specific cells within the grid.

At step 815, each of the cells 310*a–n* within the grid 300 are assigned, preferably in a random fashion, to one of the fragments 400*a–n*. In the preferred embodiment, the puzzle control module 36*b* randomly assigns fragments 400*a–n* to cells 310*a–n* using the adjacent listings within columns 600, 605 the grid table 39.

At step 820, the appearance of each fragment is altered to conform and fit the size and shape characteristics of the fragment's assigned cell. In this way, each fragment is essentially stretched or shrunk in both the vertical and horizontal directions so to conform to its assigned cell. The assignment and appearance altering for each fragment yields an initial configuration of the fragments 400*a–n*.

At step 825, the initial configuration of the fragments 400*a–n* is displayed within the grid 300, similar to the configuration illustrated in FIG. 4. In the preferred embodiment, this initial configuration is displayed within an area of the monitor 47 controlled by the network browsing program module 36*a*.

At step 830, a first fragment is selected. This first fragment is located within a first of the cells 310*a–n* within the grid 300. As previously mentioned, selection may be accomplished using either the keyboard 40 or the mouse 42.

At step 835, a new cell within the grid 300 is selected. The new cell is the desired position for the first fragment. However, the new cell currently contains a second fragment. In other words, the player desires to move the first fragment to the new cell having the second fragment already there. In this situation, the relative positions or assigned cells for the first fragment and the second fragment are simply swapped.

At step 840, the first fragment is moved to the new cell within the grid 300. In the preferred embodiment, the cell assignment for the first fragment within the grid table 39 is changed from the first cell to the new cell in order to move the first fragment.

At step 845, the second fragment is moved to the first cell preferably by changing the second fragment's cell assignment from the new cell to the first cell within the grid table 39. In this manner, the relative positions of the first fragment and the second fragment are swapped.

At step 850, the appearance of the first fragment is altered to conform to the characteristics of the new cell. Essentially, the characteristics of a cell include the cell's size, shape, and aspect ratio. After step 850, the preferred method 800 proceeds to step 855 on FIG. 8B.

Referring now to FIGS. 1–6, 8A, and 8B, the appearance of the second fragment is altered to conform to the characteristics of the first cell. Thus, steps 850 and 855 effectively change the configuration of the fragments 400*a–n* within the grid 300. This yields a new configuration of the fragments 400*a–n* within cells 310*a–n* of the grid 300. At step 860, this new configuration is displayed before proceeding to step 865.

At step 865, if the new configuration of the fragments 400*a–n* does not correctly represent the image 200, then step 865 proceeds directly back to step 830. In this situation, the new configuration of fragments 400*a–n* may appear as illustrated in FIG. 5 where the player has not yet successfully composed or reconstructed the image 200 from the fragments 400*a–n*.

However, if the new configuration of the fragments 400*a–n* correctly represents the original image 200 (as illustrated in FIG. 2), then step 865 proceeds to step 870. In this situation, the player has successfully composed the entire image 200 from the fragments 400*a–n*.

At step 870, if the personal computer 20 is still connected to the server, step 870 proceeds to step 875. Otherwise, the connection between the personal computer 20 and the server (i.e., the logical connection between the puzzle control module 36*b* and the puzzle server module 58 via the network browsing program module 36*a*) is no longer operational. For example, this may accidentally occur due to a problem with the WAN 52 or a problem with the remote computer 49. A loss of the connection may also purposefully occur in response to inputs from the player. The player may have decided to log off the server (i.e., the remote computer 49) while attempting to complete the puzzle. In this situation, the preferred method 800 terminates after step 870.

At step 875, a timestamp message is sent or uploaded to the server, preferably via the network browsing program module 36*a* communicating with the puzzle server module 58 over the WAN 52. As previously mentioned, the timestamp message contains information about the elapsed time it took the player to successfully compose the image 200 from the fragments 400*a–n*. In response to receiving the timestamp message, the puzzle server module 58 generates a score for the player based upon the information contained within the timestamp message. At step 880, the score is received or downloaded from the server.

In summary, another aspect of the first embodiment of the present invention involves composing an image from fragments of the image within a grid when two of the fragments are swapped in position. The appearances of the swapped fragments are altered to conform to characteristics of their respective new positions. This provides a visually challenging, yet simplified and elegant way of playing a "compose the picture" type of puzzle.

The Second Puzzle Embodiment From a Player's Perspective

In contrast to the grid of horizontal and vertical lines of the first puzzle embodiment, the preferred embodiment of the second puzzle utilizes a grid composed of concentric circles intersected by radii. This creates a puzzle with fragments which are all of the same shape, but which differ in orientation and size. Moreover, the second puzzle embodiment may be implemented using a grid of concentric squares, triangles, or other n-sided polygons so long as the concentric shapes are intersected by equidistantly spaced lines emanating from their center, thereby creating similarly shaped positions of different sizes and orientations. This unique arrangement of shapes ensures that the puzzle can always be solved regardless of the initial orientation (unlike some "sliding square" puzzles) and permits the puzzle to be solved in a plurality of orientations. This is explained in detail below.

FIG. 9 is a diagram of an exemplary image shown in several states of completion that may be used by the second puzzle embodiment. Referring now to FIG. 9, image 900 is used as a basis for describing the second puzzle embodiment. In this example, the exemplary image of the second embodiment 900 is a graphical representation of currency. As will be discussed later in more detail, the image 900 is typically divided into distinct fragments at predetermined positions around a center of the image when the puzzle is initially created.

FIG. 10 is a diagram illustrating the arrangement of positions of image fragments within the second embodiment of the present invention. Referring now to FIG. 10A, an exemplary grid for use by the second puzzle embodiment is illustrated by grid 1000. The exemplary arrangement of image fragments in grid 1000 is defined by positions 1000*a*–1000*i*. In particular, each of positions 1000*a*–1000*h* is a four-sided figure having two straight line sides defined by two of a plurality of equidistantly spaced radii 1002–1005 from the center of the image, and having two parallel sides defined by two of a plurality of concentric circles 1007–1009. There is also a center position 1000*i*. The four-sided figures which comprise the positions 1000*a*–1000*h* are arranged in continuous bands around the center of the image. For example, one continuous band is composed of positions 1000*a*–1000*d*. Another continuous band is composed of positions 1000*e*–1000*h*. The number of continuous bands may be advantageously varied to increase or decrease the difficulty of the puzzle. For example, grid 1000 of FIG. 10A has two such bands, grid 1010 of FIG. 10B has three such continuous bands of positions and grid 1020 of FIG. 10C has four such continuous bands. These continuous bands are created in the same manner as described above with respect to grid 1000.

FIG. 10 also illustrates alternative arrangements of positions of image fragments for use in the second puzzle embodiment. For instance, grid 1010 of FIG. 10B illustrates an arrangement of positions similar to grid 1000. However, grid 1010 indicates four concentric circles 1011 and five radii 1015 emanating from the center of the image. Grid 1020 of FIG. 10C illustrates a further expansion of this same theme. It should become apparent to those skilled in the art that the number of concentric circles and radii may be increased while still retaining the ability to solve the puzzle in multiple orientations.

Figure 10E:
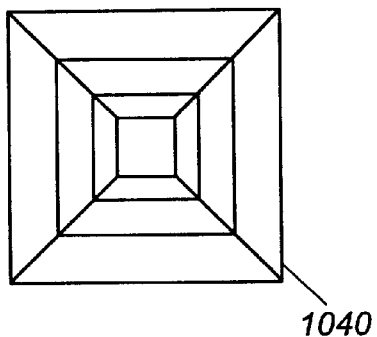
Figure 10F:
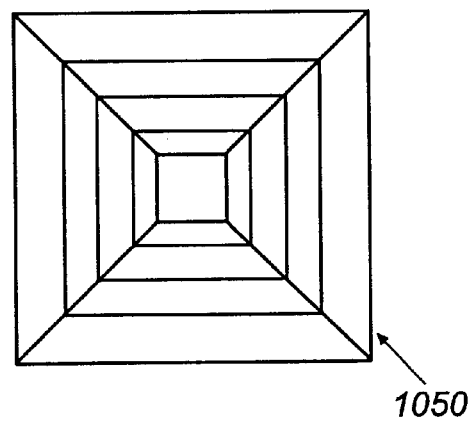
Figure 11:
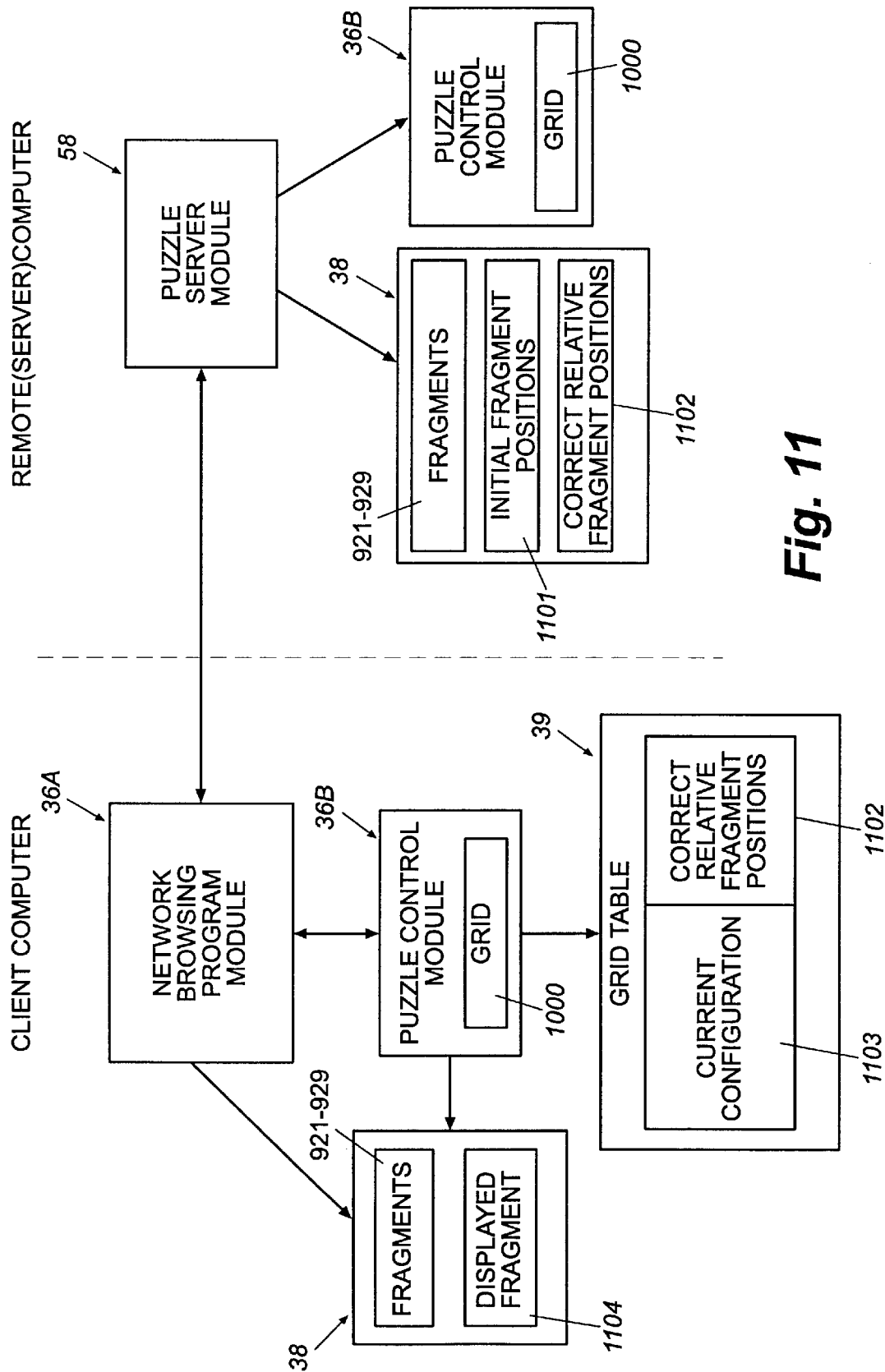
FIG. 11 is a diagram illustrating the relationships between a puzzle server module, a network browsing program module, a puzzle control module, puzzle data, initial fragment positions, correct relative fragment positions, and a grid table used by an embodiment of the present invention.

Grid 1030 of FIG. 10D illustrates an arrangement similar to the above; however, concentric squares 1031 have been substituted for the concentric circles of grids 1000, 1010 and 1020. Note that grid 1030 has four radii 1035 emanating from the center of the squares 1031 to define the positions. Grids 1040 and 1050 of FIGS. 10E and 10F expand upon this theme.

Figure 10G:
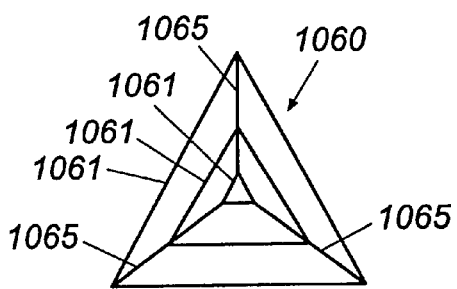
Figure 10H:
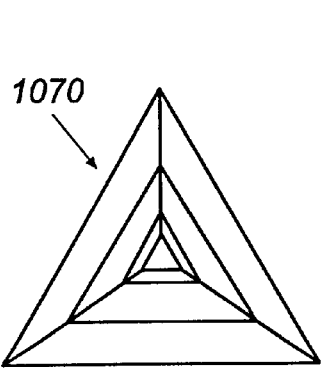
Figure 10I:
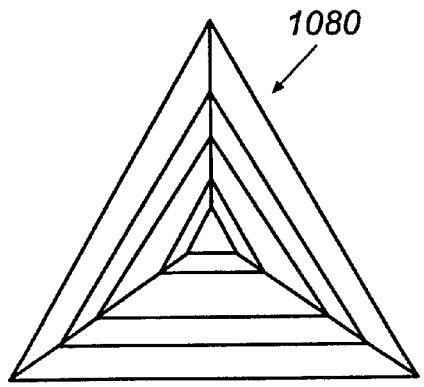

Grid 1060 of FIG. 10G illustrates a similar arrangement utilizing concentric triangles 1061 and radii 1065. Grids 1070 and 1080 of FIGS. 10H and 10I expand on this theme by adding more concentric triangles. As will be shown in more detail below, arrangement of the positions as described for each of the grids is advantageous because all of the positions are of the same shape and differ only in size and orientation. It is through arrangement of the image fragments according to these positions that the puzzle may be solved in a plurality of orientations.

Figure 9A:
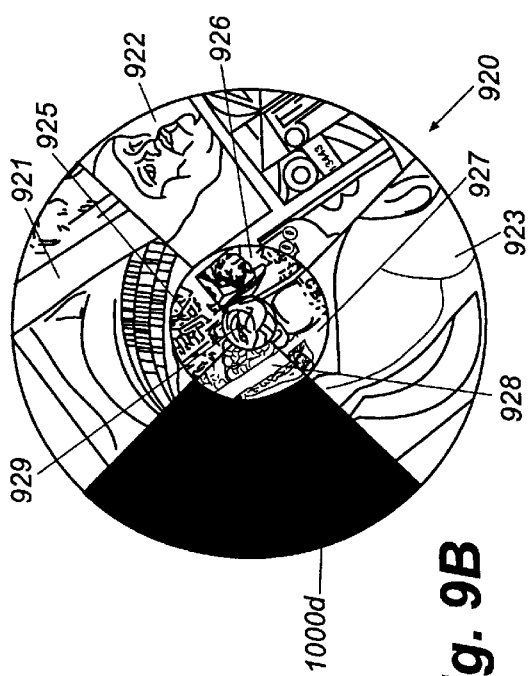
FIGS. 9A–9D represent an exemplary image used by an embodiment of the present invention in several states of completion.

Referring now to FIGS. 9A and 10A, image 900 is an exemplary image used by the second puzzle embodiment and grid 1000 is an exemplary grid. In the second puzzle embodiment, fragments 921–929 are defined by dividing image 900 into positions 1000*a–h* and center position 1000*i* as shown in exemplary grid 1000. For instance, in image 900, fragment 925 is at position 1000*a,* fragment 922 is at position 1000*b,* and fragment 926 is at position 1000*c.* Also, center fragment 924 is located at center position 1000*i.* It is in this manner that fragments 921–929 are assigned positions within exemplary image 900. Note that image 900 could have been divided into fragments according to grids 1010, 1020, 1030, 1040, 1050, 1060, 1070, 1080, or other similar grids as described above.

Figure 9B:
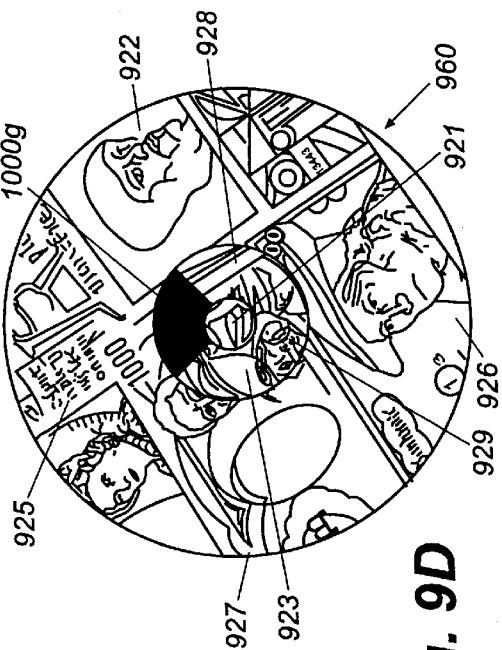

Image 920 of FIG. 9B shows an initial configuration of fragments 921–929 according to positions 1000*a*–1000*i.* The initial configuration of image 920 is created by shuffling a plurality of fragments 921–929 and visually altering them to correspond to the defined characteristics of their respective positions 1000*a*–1000*i.* With regard to the shuffling of the fragments in image 920, a plurality of fragments 921–929 have been shuffled between positions 1000*a*–1000*i* within image 920. For instance, fragment 926 was located at position 1000*c* in image 900 and is now located at position 1000*f* in image 920. Fragment 921, which was located at position 1000*f* in image 900, is now located at position 1000*a* in image 900. A plurality of fragments 921–929 are shuffled between positions 1000*a*–1000*i* in this manner to create an initial configuration of fragments 921–929.

Note that not all of fragments 921–929 have been shuffled in image 920. For instance, fragment 922 is at position 1000*b* in image 900 and is still located at position 1000*b* in image 920. Note also that, in the second puzzle embodiment, one of fragments 921–929 is omitted prior to shuffling. In the preferred embodiment, the fragment located at center position 1000*i* is omitted prior to shuffling fragments. In the exemplary image 920, fragment 924 which was located at position 1000*i* in image 900 was omitted prior to shuffling fragments 921–929. Therefore, fragment 924 does not appear in image 920 and an initial empty position is therefore created. In image 920, the initial empty position is located at position 1000*d.*

In order to create the initial configuration of fragments 921–929, each of fragments 921–929 must also be altered to conform to the defined characteristics of its respective position. In image 920, each of fragments 921–929 has been altered to conform to the defined characteristics of its respective position within the image. In particular, each of fragments 921–929 has been altered in its size or orientation or both as required to conform to the defined characteristics of its respective position. For instance, fragment 926 was in position 1000*c* in image 900 and was moved to position 1000*f* in image 920. Because position 1000*f* is smaller than position 1000*c,* the size of fragment 926 was reduced in image 920 to correspond to the size of position 1000*c.* Also, because the orientation of position 1000*c* is different than position 1000*f,* the orientation of fragment 926 was altered to correspond to the orientation of position 1000*f.* Each of fragments 921–929, is altered in this manner to correspond to the defined characteristics of its respective position. Fragments which were not shuffled already conform to the defined characteristics of their respective positions and therefore, there is no need to visually alter these fragments.

Techniques for visually altering the size and orientation of image fragments are well know to those skilled in the art.

A fragment which is shuffled from a position other than the center position 1000*i* into the center position 1000*i,* is visually altered to conform to the shape of the center position, while retaining as many of its visual characteristics as possible. A technique for altering an image fragment in this manner is discussed in detail below. Also, when creating the initial configuration, the center fragment is given the same orientation as the initial empty position. For example, in image 920, fragment 929 located at center position 1000*i* has the same orientation as initial empty position 1000*i.* Techniques for altering the orientation of a circular image fragment are well known to those skilled in the art.

Once the initial configuration of the fragments 921–929 has been created as described above, the image 920 is displayed to the puzzle player for the first time. Now the player may begin to play the puzzle by selecting one of the fragments 921–929 as a selected fragment. In the preferred embodiment, the player may only select a fragment 921–929 located in a position directly adjacent to the initial empty position. For instance, in image 920 the initial empty position is located at position 1000*d.* Therefore, in the preferred embodiment, the player would only be permitted to select fragments located in positions 1000*c,* 1000*h,* or 1000*a.* In another example, if the initial empty position were the center position 1000*i,* the player would only be permitted to select one of the fragments located at positions 1000*e,* 1000*f,* 1000*g,* or 1000*h.*

Once the player has selected a fragment, it is moved to a second position within the image. In the preferred embodiment of the second puzzle, the selected fragment may only be moved to the initial empty position. For example, referring again to FIG. 9, suppose that the player selected fragment 928 located at position 1000*d* in image 920. Fragment 928 would then be moved to initial empty position 1000*d,* thereby creating a new empty position 1000*h.*

When the selected fragment is moved to the second position, it is again visually altered to conform to the defined characteristics of the second position. In particular, the size or orientation or both of the selected fragment is altered to conform to the defined characteristics of the second position. For instance, with regard to the previous example, when fragment 928 is moved from position 1000*h* to 1000*d,* its size is increased to conform to the size of position 1000*d.* This is illustrated in image 940. The orientation of fragment 928 is not altered in image 940, however, because the orientation of position 1000*h* is the same as the orientation of position 1000*d.* The selected fragment, therefore, maintains its orientation with respect to a radius of the circle.

In this second puzzle embodiment, the orientation of the center fragment may also be altered to correspond to the orientation of the new empty position when the selected fragment is moved. In the previous example it was not necessary to alter the orientation of the center fragment because the orientation of the new empty space was the same as the orientation of the initial empty space. Therefore, the orientation of the fragment located at the center position 1000*i* is the same in both image 920 and in image 940. If, however, fragment 923 in image 920 was selected and moved to position 1000*d,* the new empty position would be position 1000*c.* It would then be preferred to alter the orientation of the center fragment to correspond to the orientation of the new empty position 1000*c.* The orientation of the center fragment is altered in this way to advantageously permit the player to better recognize fragments moved from positions other than the center position to or from the center position.

Figure 9C:
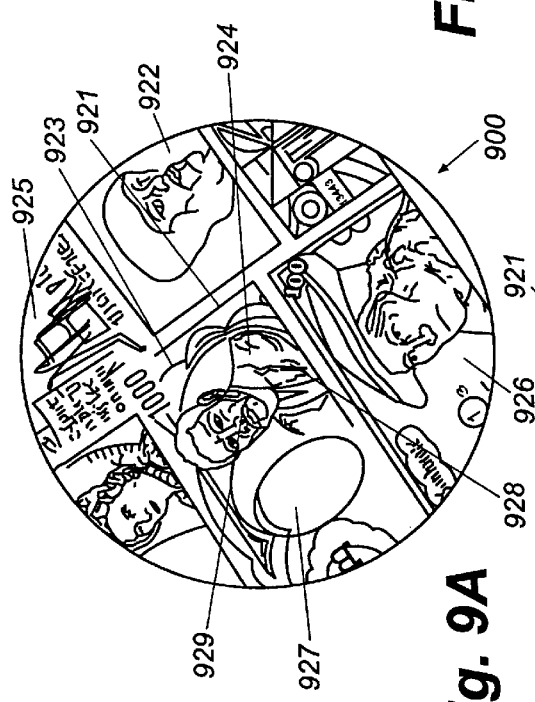

A new configuration of fragments 921–929 is created when the selected fragment has been moved to the second position and visually altered, and the orientation of the center fragment has been altered if necessary. Now, the new configuration of fragments 912–929 is displayed within the image. For example, image 940 of FIG. 9C is displayed after fragment 928 is moved from position 1000h, shown in image 920, to position 1000d, shown in image 940, and visually altered.

Figure 9D:
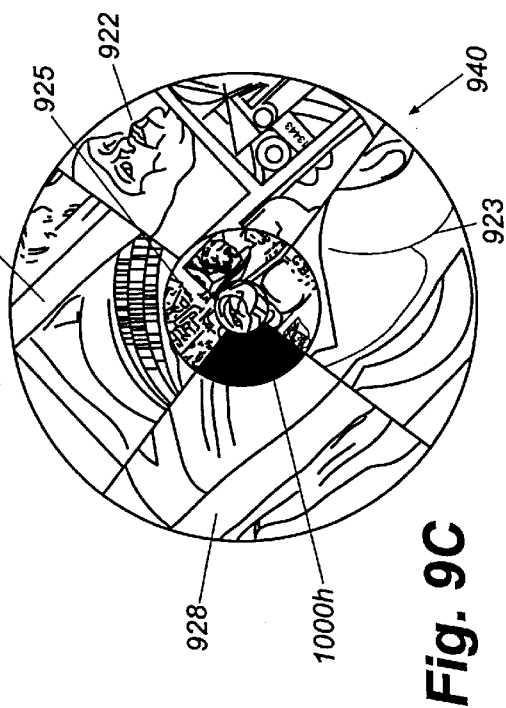

After each fragment 921–929 is moved, a check is made to determine whether the new configuration represents the image 900 in any of the possible orientations. If the new configuration of fragments 921–929 does not correctly represent the image 900, then the player continues the process of selecting and moving fragments 921–929 as described above. For instance, image 960 of FIG. 9D shows another new configuration of fragments 921–929 prior to solution. In image 960, the outer band consisting of positions 1000a, 1000b, 1000c, and 1000d has been solved in one orientation. Note that this outer band could have been solved in other orientations by rotating the fragments 925, 922, 926, and 927 either in a clockwise or a counterclockwise direction. However, so long as these fragments are adjacent to each other in the correct order, the outer band remains solved and the orientation of these fragments does not matter. This is further illustrated by examining the inner band of image 960 comprised of positions 1000e, 1000f, 1000g, and 1000h. Position 1000e is the new empty position, position 1000f contains fragment 928, position 1000g contains fragment 929, and position 1000h contains fragment 923. Each of these three fragments are in their correct relative positions to each other. Therefore, to solve image 960, fragments 928, 929, and 923 must each be rotated clockwise one position and fragment 921 located in center position 1000i must be moved to position 1000f. This can be accomplished by moving these fragments as described above. Alternatively, the puzzle could be solved by rotating each of the fragments in the outer band one position counter-clockwise and moving fragment 921 located in center position 1000i to position 1000e. The puzzle would then be solved in a different orientation. When it is determined that the new configuration correctly represents image 900, then the omitted fragment 924 is displayed.

Essentially, the process of moving fragments 921–929 described above continues until the configuration of the fragments 921–929 correctly represents the image 900 as shown in FIG. 9A in any of the possible orientations. When all of the fragments 921–929 correctly represent the image 900, the configuration of the fragments will look like image 900, however, the solved image may be in a different orientation than image 900. Thus, from a player's perspective, the puzzle is played by composing the image using fragments 921–929 and grid 1000.

In a similar manner, square and triangular images may be divided into fragments that may be arranged in initial configurations according to one of the appropriate grids shown in FIGS. 10D–10I. Movement of the image fragments between these grid positions to solve the puzzle in one of multiple possible orientations is similar to the process described in connection with the image 900 and the grid 1000.

In an on-line version of this puzzle embodiment, a timestamp representing the amount of time needed to solve the image 900 will be uploaded to the server once the player has solved the image 900. The puzzle server module 58 then generates a score or completion ranking for the player. The score is typically based on the timestamp and upon the difficulty level of the particular puzzle. The score is then downloaded from the server to the network browsing program module 36a and displayed to the player.

Software Modules Used to Implement the Second Puzzle Embodiment

Like the first puzzle embodiment, there are software modules beyond the player's perspective which are used to implement the second puzzle embodiment. These software modules operate much like the software modules discussed above with respect to the first puzzle embodiment. The operation of these modules and the differences between the software modules utilized by the first and second puzzle embodiments are discussed below.

FIG. 11 is a diagram illustrating the relationships between various software program modules in the second embodiment of the present invention. Referring now to FIGS. 1–11, as with the first puzzle embodiment, the network browsing program 36a is used to make a connection between the personal computer 20 and a server, such as the remote computer 49. The connection is typically made via the WAN 52, although other logical connections between the personal computer 20 and the server may be utilized. In this way, the network browsing module 36a communicates with the server.

In this embodiment of the present invention, a puzzle control module 36b is downloaded from the server to the personal computer 20. Like the first embodiment, the puzzle control module of the second embodiment controls how a player interacts with the computerized puzzle. In one embodiment, the puzzle control module 36b is a downloadable plug-in program module or applet used in conjunction with the network browsing program 36a. The puzzle control module may also be implemented as a stand alone program module.

In the first puzzle embodiment, the grid was downloaded from the server separately from the puzzle control module 36b. In the second puzzle embodiment, however, the grid 1000 is actually a part of the puzzle control module and is downloaded from the server along with the puzzle control module. This is illustrated in FIG. 11.

Once the puzzle control module 36b is downloaded, the puzzle fragments 921–929 are downloaded from the server as well, and stored in the puzzle data object 38. Also downloaded are initial fragment positions 1101 within the grid 900. These initial fragment positions 1101 are stored in the current configuration object 1103 of the grid table 39. A set of correct relative fragment positions 1102 are downloaded and stored in the grid table 39. The correct relative fragment positions 1102 are necessary because the image 900 may be solved in any one of a plurality of orientations, and therefore there are multiple solved positions for each fragment. That is, each of fragments 921–929 may end up in one of a plurality of different positions 1000a–1000i depending upon the orientation in which the image 900 is solved. Therefore, the correct relative fragment positions 1102 are composed of data representing the positions of each of the fragments 921–929 with relation to each of the other fragments 921–929 when the image is solved.

Once the above information has been downloaded from the server, an initial configuration of the fragments 921–929 is displayed. The initial configuration of fragments 921–929 is created by assigning fragments 921–929 their initial fragment positions 1101. Alternatively, the fragments could be assigned initial positions randomly, as in the first puzzle embodiment.

After fragments 921–929 have been assigned their initial fragment positions, each of fragments 921–929 is then visually altered to conform to the defined characteristics of its respective position within grid 1000. In the preferred embodiment, the puzzle control module 36b is operative to visually alter the size or orientation of fragments 921–929 to conform to the size or orientation of their respective positions within grid 1000. This alteration may include altering the appearance of an outer C-shaped fragment to conform to the circular shape of center position 1000i. The transformation of the C-shaped fragment into a circular fragment is accomplished by first converting the C-shaped fragment into a rectangle. If the C-shaped fragment has borders consisting of a small arc, a large arc, a left radii, and a right radii, it may be described in polar coordinates (where Ro is the radial position of a point and Phi is its angular position) as:

$$Ro=Const1; \text{ for } Phi1<Phi<Phi2 \ \{\text{``big arc''}\}$$

$$Ro=Const2; \text{ for } Phi1<Phi<Phi2 \ \{\text{``small arc''}\}$$

$$Phi=Const3=Phi2; \text{ for } Const2<Ro<Const1 \ \{\text{``Left Radii''}\}$$

$$Phi=Const4=Phi1; \text{ for } Const2<Ro<Const1 \ \{\text{``Right Radii''}\}$$

The corresponding Cartesian coordinates (Xold, Yold) for points of the C-shaped fragment are:

$$Xold=Ro*Cos (Phi)$$

$$Yold=Ro*Sin (Phi)$$

The first intermediate transformation of the C-shaped fragment into the rectangle is:

$$Xint=Ro$$

$$Yint=Phi$$

Or, in detail:

$$Xint=SQRT(Xold^2+Yold^2)$$

$$Yint=ARCTG (Yold/Xold)$$

where Xint and Yint are the coordinates of points of the rectangle, SQRT is the square root of the expression in parenthesis, and ARCTG is the arc-tangent of the expression in parenthesis. The new shape is a rectangle with the coordinates:

$$Yint=Const1; \text{ for } Const4<Xint<Const3 \ \{\text{``Top side''}\}$$

$$Yint=Const2; \text{ for } Const4<Xint<Const3 \ \{\text{``Bottom side''}\}$$

$$Xint=Const3; \text{ for } Const2<Yint<Const1 \ \{\text{``Left side''}\}$$

$$Xint=Const4; \text{ for } Const2<Yint<Const1 \ \{\text{``Right side''}\}$$

Program loops may be used for the variables Xold and Yold to cover the area of the C-shaped fragment. Also, it is necessary to copy the color of each pixel (Xold, Yold) of the C-shaped fragment to each corresponding pixel (Xint, Yint) of the rectangle. The resulting rectangle is then transformed into a square using the StretchBlt () function, discussed above, or other appropriate transformation. The square is then masked with a circle and the image data that is within the square but which is outside the circle is removed, leaving a circular image fragment. Techniques for masking an image fragment in this manner are well known to those skilled in the art. Alternatively, a mathematical smoothing function may be used to transform the square into a circle.

Note that the puzzle control module 36b may retain a reference copy of fragments 921–929 in memory upon which to perform the above discussed alterations. This copy of fragments 921–929 is referred to as displayed fragments 1104 and is illustrated in FIG. 11. The displayed fragments object 1104 advantageously ensures that fragments 921–929 will not lose their visual characteristics as might occur if multiple alterations were performed on the same fragment. Techniques for altering the size or orientation of image fragments are well known to those skilled in the art.

In the second puzzle embodiment, one of the puzzle fragments is omitted prior to displaying the initial configuration. The omission of a fragment creates an initial empty position within the image 900. Prior to displaying the initial configuration, the orientation of the fragment located at center position 1000i is altered so that its orientation is the same as the initial empty position. Techniques for altering the orientation of a circular image fragment are well known to those skilled in the art.

Once the initial configuration of the image 900 has been displayed, the player may begin playing the puzzle. The player interacts with the personal computer 20 to play the puzzle. Inputs via the mouse 42 or the keyboard 40 are interpreted by the puzzle control module 36b when the player plays the on-line puzzle. The player may use the mouse 42 or the keyboard 40 to select a fragment as described above. The puzzle control module 36b is then operative to move the selected fragment to a second position and to visually alter the fragment to conform to the size and orientation of the second position.

After each move, the puzzle control module 36b determines whether the new configuration of fragments correctly represents the image in any of the possible orientations. In order to make this determination, the puzzle control module 36b creates a grid table 39 in memory to track and manage the relative assignments of the fragments 921–929 to the positions 1000a–1000i within the image 900. After each fragment is moved, the puzzle control module 36b updates the current configuration 1103 to reflect the changed positions of the fragments 921–929. The puzzle control module 26b then compares the current configuration 1103 to the correct relative fragment positions 1102 to determine if the image is solved. In particular, the puzzle control module 36b first determines whether each fragment is in its correct band of the grid 1000. If each fragment is in the correct band, the puzzle control module 36b determines if the fragments adjacent to each fragment are in their correct relative positions. If, for each fragment, the adjacent fragments are in their correct relative fragment positions 1102, then the image 900 has been solved. When the image 900 is solved, the puzzle control module 36b displays the omitted fragment.

Figure 12A:
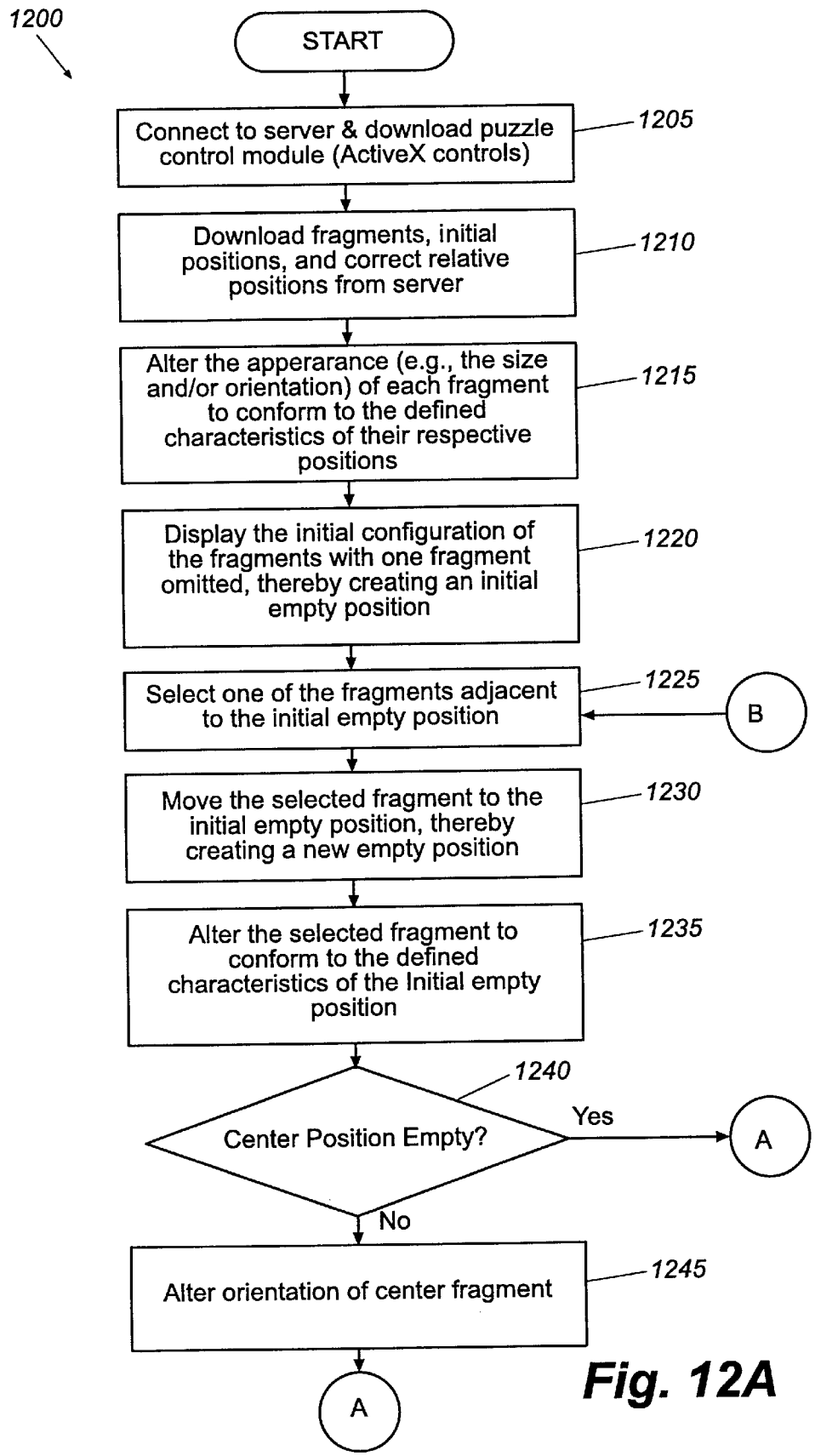
FIG. 12, consisting of FIGS. 12A–12B, is a flow diagram illustrating steps for composing an image from image fragments when one image fragment is omitted.
Figure 12B:
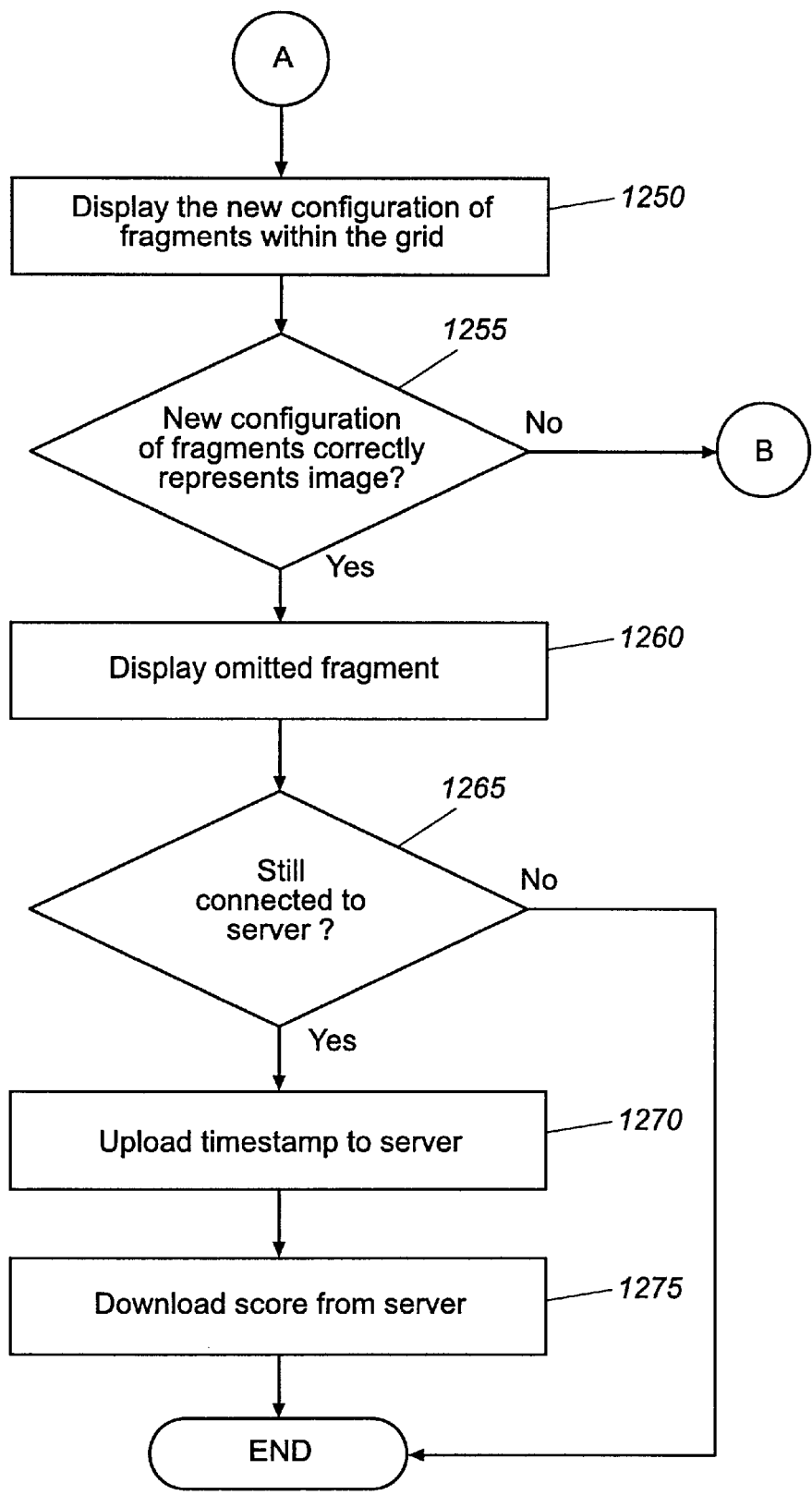

FIG. 12, consisting of FIGS. 12A and 12B, is a flow diagram which supports the second puzzle embodiment for composing an image. Referring now to FIG. 12A, the method 1200 begins at step 1205 where the personal computer 20 is connected to the server (e.g., the remote computer 49), preferably using the network browsing program module 36a. Once connected to the server, a puzzle control module is downloaded. The puzzle control module 36b is preferably an applet written to support the standard ActiveX network programming language.

At step 1210, the fragments 921–929, the initial fragment positions 1101, and the correct fragment relative positions 1102 are also downloaded. At step 1215, the appearance of fragments 921–929 is altered to conform to the defined characteristics of their respective positions within the grid 1000. This yields an initial configuration of fragments 921–929.

At step 1220, the initial configuration of the fragments is displayed with one fragment omitted. Thereby, an initial empty position is created within the image 900. At step 1225, one of the fragments adjacent to the initial fragment is selected. Selection of a fragment may be accomplished by using the mouse 42 or the keyboard 40. The player may use the mouse 42 to position a cursor on the monitor 47 above the desired fragment before clicking on the fragment to select it. Alternatively, the player may also use arrow keys on the keyboard 40 to position the cursor above the desired fragment. Selection of the fragment may be accomplished by pressing the spacebar key or another key on the keyboard 40.

At step 1230, the selected fragment is moved to the initial empty position, thereby creating a new empty position within the image. At step 1235, the size or orientation of the selected fragment is visually altered to conform to the size and orientation of the initial empty position. If the initial empty position is the center position 1000i, the selected fragment is visually altered to fit into the circular center position 1000i as described above.

At decision step 1240, a determination is made as to whether a fragment is located at the center position 1000i. If a fragment is not located at the center position 1000i, the method continues to step 1250 in FIG. 12B. If a fragment is located at the center position 1000i, the orientation of the center fragment is altered to correspond with the orientation of the new empty position in step 1245 and a new configuration of fragments 921–929 is created. The puzzle control module 36b preferably updates the current configuration 1103 in the grid table 39 to reflect the changed assignment of fragments 921–929 within the grid 1000.

Referring now to FIG. 12B, in step 1250 the new configuration of fragments 921–929 contained in current configuration 1103 is displayed. At decision step 1255, the puzzle control module determines if the new configuration contained in current configuration 1103 correctly represents the image 900 in any of the possible orientations as described above. If the current configuration 1103 does not correctly represent the image 900, then step 1255 proceeds back to step 1225 for selection of another fragment. If, however, at step 1255 the new configuration of fragments 921–929 contained in current configuration 1103 correctly represents the image 900, the puzzle is solved and the omitted fragment is displayed in step 1260.

At step 1265, if the personal computer 20 is still connected to the server, step 1265 proceeds to step 1270. If the personal computer 20 became disconnected from the server, the player would still be able to play the puzzle by performing steps 1225–1260. However, if the personal computer 20 is no longer connected to the server, the preferred method 1200 terminates after step 1265.

At step 1270, the connection to the server is still operational and a timestamp message is uploaded to the server, preferably via the network browsing program module 36a. The timestamp message essentially contains a timestamp representing the player's elapsed playing time to correctly compose the image 900 (i.e., solving the puzzle). The puzzle server module 58 on the server receives the timestamp message and generates a score, typically based on the timestamp and the level of difficulty for the puzzle. At step 1275, the score is downloaded back to the personal computer 20 for display to the user.

Other Puzzle Embodiments

Other puzzle embodiments may be created which include elements from the above described embodiments. Two of such alternate embodiments are illustrated in FIG. 13.

Figure 13A:
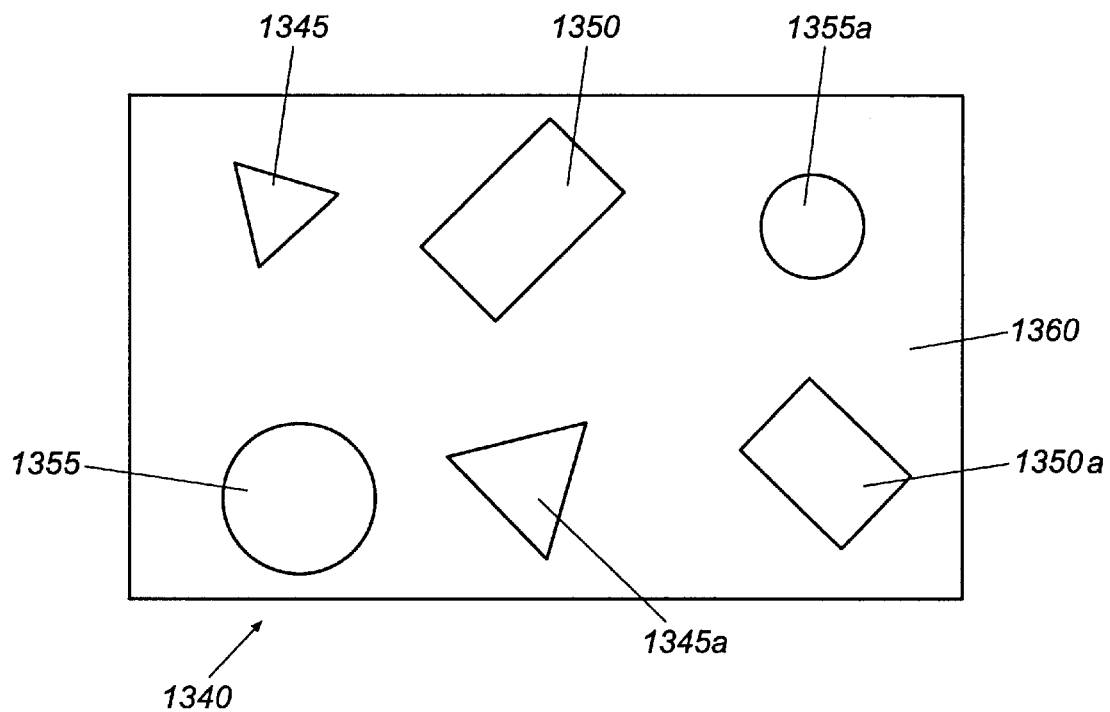
FIGS. 13A and 13B are diagrams illustrating two possible arrangements of positions of image fragments in a further embodiment of the present invention.

Referring now to FIG. 13A, grid 1340 illustrates an alternative embodiment similar to the first puzzle embodiment described above. In grid 1340 a plurality of positions 1345, 1350, and 1355, are defined which vary in size, shape, and orientation. The positions 1345, 1350, and 1355 do not, however, compose the entire grid 1340. Rather, much of the grid is undefined by positions, thereby creating a large unscrambled area 1360. In this alternate embodiment, the puzzle would be played by creating in the image positions 1345, 1345a, 1350, 1350a. 1355, and 1355a. The remainder of the image would be displayed in unscrambled position 1360. Because the unscrambled area 1360 is so large, the discovery factor is greatly encouraged. A puzzle of this type would be ideal for small children who may have a difficult time recognizing the target image.

This alternate embodiment would be played in a similar manner to the first puzzle embodiment discussed above. For example, positions 1355 and 1355a would be swapped with each other and visually modified to correspond to the defined characteristics of their respective positions. Likewise, positions 1345/1345a and positions 1350/1350a would be swapped to solve the puzzle.

Figure 13B:
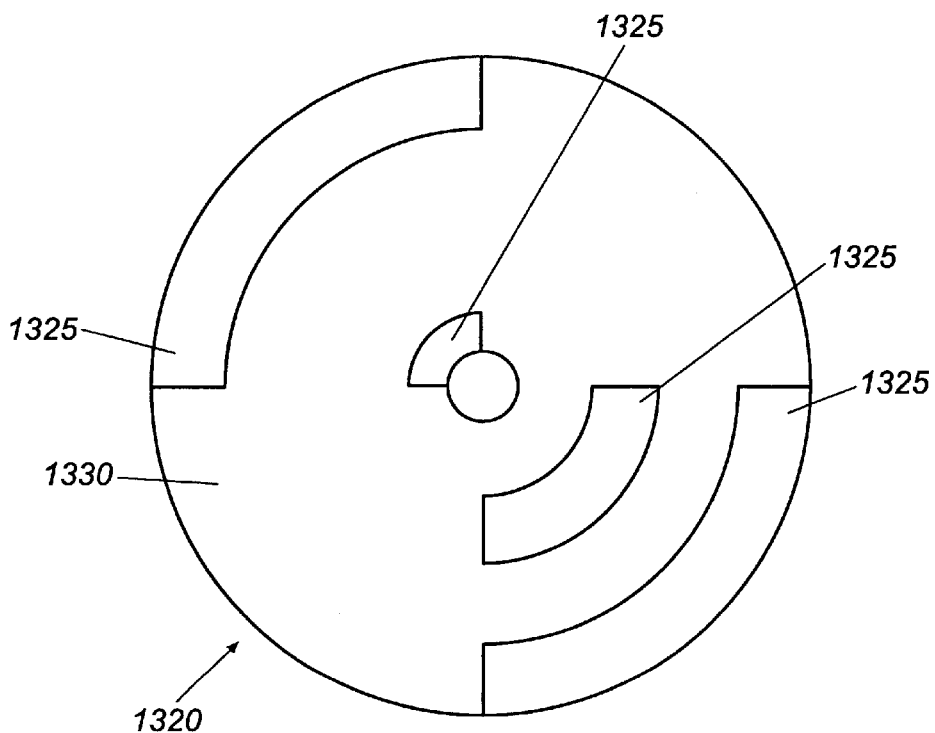

A grid 1320 is illustrated in FIG. 13B for a second alternate embodiment similar to the second puzzle embodiment discussed above. This second alternate embodiment plays exactly like the second puzzle embodiment, however, the entire image is not scrambled. Instead, only a portion of the image is defined as moveable fragments which vary only in size and orientation from each other. This is illustrated in grid 1320 where fragments 1325 are defined and a large unscrambled area 1330 is left remaining. The game can be programmed to allow exchange of any two fragments 1325, or to leave an empty position into which can be moved any selected fragment 1325. Like the first alternate embodiment of FIG. 13A, because there is a large unscrambled area 1330, this alternate embodiment encourages the discovery factor and is ideal for play by small children.

Conclusion

From the foregoing description, it will be appreciated that the present invention provides systems and methods for composing an image from fragments of the image according to various playing grids. Initially, a puzzle control module is downloaded from a server. The puzzle control module operates in conjunction with a network browsing program module. Next, the fragments and the grid are downloaded. The positions of the fragments are shuffled within the grid. The appearance of each fragment is then altered to conform to characteristics of the fragment's position or cell within the grid. After displaying an initial configuration of the fragments, fragments are selected and moved to new positions or cells within the grid. In one embodiment, a single fragment is selected and moved to a new, empty cell. In another embodiment, two fragments are swapped between their respective positions or cells. After moving or swapping any fragments, the appearance of a moved or swapped fragment is altered to conform to characteristics (such as the size, shape, orientation, and aspect ratio) of the fragment's new position or cell within the grid. This new configuration of the fragments is displayed. If the new configuration represents the original image and a connection to the server is still operational, a timestamp is uploaded to the server. In response to the uploaded timestamp, a score is generated and downloaded reflecting the player's score when composing the image from the fragments. In one embodiment of the present invention the image may be advantageously solved in a plurality of orientations.

The foregoing system may be conveniently implemented in one or more program modules that are based upon the flow charts in FIGS. 7A, 7B, 8A, 8B, 12A, and 12B. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes. The present invention may be implemented in a network environment as described, or on a stand-alone computer, such as a personal computer, hand-held computer, or video game system.

The present invention has been described in relation to particular embodiments which are intended in all respects to be illustrative rather than restrictive. The particular embodiment described is one of an on-line game or puzzle where the puzzle contains fragments of an image which are moved within a playing grid of cells. However, those skilled in the art will understand that the principles of the present invention apply to any process that alters the appearance of image fragments when moved within a grid.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-readable medium on which is stored a computer program for composing an image in which are defined a plurality of non-uniform fragments at predetermined positions within the image, the computer program comprising instructions, which when executed by a computer, perform the steps of:
   (a) displaying an initial configuration of said fragments within the image;
   (b) selecting one of said fragments as a selected fragment, said selected fragment located within one of said positions within the image;
   (c) moving said selected fragment to a second of said positions within the image, said second position having defined characteristics; and
   (d) altering an appearance of said selected fragment to conform to the defined characteristics of said second position.

2. The computer-readable medium of claim 1 further comprising, prior to step (a), the steps of:
   shuffling a plurality of said fragments between said positions within the image; and
   altering an appearance of each of said fragments when required to conform to the defined characteristics of its respective position within the image, thereby creating the initial configuration of the fragments within the image.

3. The computer-readable medium of claim 2, wherein the altering step further comprises altering a size of said selected fragment or an aspect ratio or both of said selected fragment as required to conform to the defined characteristics of said second position.

4. The computer-readable medium of claim 2, wherein the altering step further comprises altering a size of said selected fragment or an orientation or both of said selected fragment as required to conform to the defined characteristics of said second position.

5. The computer-readable medium of claim 1 further comprising, after step (d), the step of displaying a new configuration of said fragments within said image.

6. The computer-readable medium of claim 5 further comprising the step of determining if the new configuration of the fragments correctly represents the image.

7. The computer-readable medium of claim 6 further comprising the step of if the new configuration does not correctly represent said image, then repeating from step (b).

8. The computer-readable medium of claim 1, wherein the altering step further comprises altering a size of said selected fragment and an aspect ratio of said selected fragment to conform to the defined characteristics of said second position.

9. The computer-readable medium of claim 1, wherein the altering step further comprises altering a size of said selected fragment or an orientation of said selected fragment to conform to the defined characteristics of said second position.

10. A method for composing an image in which are defined a plurality of non-uniform fragments at predetermined positions within the image, the method comprising the steps of:
    (a) displaying an initial configuration of said fragments within the image;
    (b) selecting one of said fragments as a selected fragment, said selected fragment located within one of said positions within the image;
    (c) moving said selected fragment to a second of said positions within the image, said second position having defined characteristics; and
    (d) altering an appearance of said selected fragment to conform to the defined characteristics of said second position.

11. The method of claim 10, wherein step (e) further comprises altering a size or an orientation or both of said selected fragment as required to conform to the defined characteristics of said second position.

12. The method of claim 10, wherein step (e) further comprises altering a size or an aspect ratio or both of said selected fragment as required to conform to the defined characteristics of said second position.

13. The method of claim 10 further comprising, prior to step (a), the steps of connecting to a server computer system and downloading a control module used for moving said fragments and altering the appearance of said fragments.

14. The method of claim 13 further comprising, after the step of downloading the control module and prior to step (a), the step of downloading said fragments and said positions from said server computer system.

15. The method of claim 14 further comprising, after the step of downloading said fragments and said positions and prior to step (a), the steps of:
    shuffling a plurality of said fragments between said positions within the image; and altering an appearance of each of said fragments when required to conform to the defined characteristics of its respectively assigned position within the image, thereby creating the initial configuration of the fragments within the positions of said image.

16. The method of claim 15 further comprising, after step (d), the step of displaying a new configuration of said fragments within said positions of the image.

17. The method of claim 16 further comprising the step of determining if the new configuration of said fragments correctly represents said image.

18. The method of claim 17 further comprising the step of if the new configuration does not correctly represent said image, then repeating from step (b).

19. The method of claim 18 further comprising the step of if the new configuration correctly represents said image, then sending a timestamp to a server computer system, the timestamp representing an elapsed time it took to compose said image from said fragments.

20. The method of claim 19 further comprising the step of receiving a completion ranking from said server computer system, the completion ranking based upon said timestamp.

21. A computer system for composing an image within a computerized puzzle, the image divided into a plurality of non-uniform fragments at predetermined positions within the image, the computer system comprising:
    a processor;
    a memory coupled to the processor, the memory maintaining the fragments, the positions, and a control module; and
    a display device coupled to the processor for displaying a configuration of the fragments;
    an input device coupled to the processor;
    the input device being operative to:
        select one of said fragments as a selected fragment, said selected fragment located within one of the positions in the image,
    the processor being operative to:
        execute instructions within the control module to control the computerized puzzle,
        move said selected fragment to a second of said positions in response to selecting said selected fragment,
        alter an appearance of said selected fragment to conform to defined characteristics of said second position.

22. The computer system of claim 21, wherein said processor is further operative to:
    alter a size or an aspect ratio or both of said first fragment to conform to the defined characteristics of said second position.

23. The computer system of claim 21, wherein said processor is further operative to:
    alter a size or an orientation or both of said selected fragment to conform to the defined characteristics of said second position.

24. The computer system of claim 21 further comprising a communications interface coupled to the processor, the communications interface connecting a server to the computer system; and
    wherein the processor is further operative to download said control module, said fragments, and said positions from the server to memory.

25. The computer system of claim 24, wherein the processor is further operative to determine if the configuration of said fragments correctly represents the image.

26. The computer system of claim 25, wherein the processor is further operative to, if the configuration correctly represents the image, send a timestamp from the computer system to the server via the communications interface, the timestamp representing an elapsed time it took to compose the image from the fragments.

27. The computer system of claim 26, wherein the processor is further operative to receive a completion ranking from the server via the communications interface, the completion ranking based upon the timestamp.

28. A computer-readable medium on which is stored a computer program for composing an image in which are defined a plurality of outer fragments at predetermined positions around a center of the image, each outer fragment varying in size or orientation or both from the other outer fragments, and the computer program comprising instructions, which when executed by a computer, perform the steps of:
    (a) displaying an initial configuration of said fragments within said image;
    (b) selecting one of said fragments as a selected fragment, said selected fragment located within one of said positions within the image;
    (c) moving said selected fragment to a second of said positions within the image, said second position having defined characteristics; and
    (d) altering an appearance of said selected fragment when required to conform to the defined characteristics of said second position.

29. The computer-readable medium of claim 28, wherein said outer fragments are similarly shaped.

30. The computer-readable medium of claim 29, wherein said step of altering an appearance of said selected fragment comprises altering the size or orientation or both of said selected fragment.

31. The computer-readable medium of claim 30, wherein said positions are four-sided figures having a pair of straight sides along radii from the center of the image.

32. The computer-readable medium of claim 31, wherein said four-sided figures are arranged in continuous bands around a center of said image.

33. The computer-readable medium of claim 32, wherein the number of continuous bands may vary, thereby making it easier or more difficult to compose said image.

34. The computer-readable medium of claim 32, wherein said entire image is divided into said four-sided figures.

35. The computer-readable medium of claim 34, further comprising a center fragment including the center of the image and around which said four-sided figures are positioned.

36. The computer-readable medium of claim 35 further comprising, prior to step (a), the steps of:
    shuffling a plurality of said fragments between said positions within the image; and
    altering an appearance of each of said fragments when required to conform to the defined characteristics of its respective position within the image, thereby creating the initial configuration of the fragments within the image.

37. The computer-readable medium of claim 36, wherein one of said fragments is omitted prior to the displaying step, thereby creating an initial empty position within said image.

38. The computer-readable medium of claim 37, wherein the moving step comprises moving said selected fragment of step (b) to said initial empty position, thereby creating a new empty position.

39. The computer-readable medium of claim 38, wherein said selected fragment comprises one of said plurality of outer fragments at a position adjacent to said initial empty position.

40. The computer-readable medium of claim 39, wherein the altering step further comprises preserving the orientation of said selected fragment with respect to a radius.

41. The computer-readable medium of claim 40, wherein the altering step further comprises altering an appearance of said center fragment so that said center fragment has the same orientation with respect to said new empty position as it had to said initial empty position.

42. The computer-readable medium of claim 41 further comprising, after step (d), the step of displaying a new configuration of said fragments within said image.

43. The computer-readable medium of claim 42 further comprising the step of determining if the new configuration of the fragments correctly represents the image.

44. The computer-readable medium of claim 43 further comprising the step of if the new configuration does not correctly represent said image, then repeating from step (b).

45. The computer-readable medium of claim 44 further comprising the step of if the new configuration correctly represents said image, then displaying said omitted fragment in said new empty position.

46. A method for composing an image in which are defined a plurality of outer fragments at predetermined positions around a center of the image, each outer fragment varying in size or orientation or both from the other outer fragments, the method comprising the steps of:
 (a) displaying an initial configuration of said fragments within said image;
 (b) selecting one of said fragments as a selected fragment, said selected fragment located within one of said positions within the image;
 (c) moving said selected fragment to a second of said positions within the image, said second position having defined characteristics; and
 (d) altering an appearance of said selected fragment when required to conform to the defined characteristics of said second position.

47. The method of claim 46, wherein step (d) further comprises altering a size of said selected fragment or an aspect ratio of said selected fragment to conform to the predetermined characteristics of said second position.

48. The method of claim 47 further comprising, prior to step (a), the steps of connecting to a server computer system and downloading a control module used for moving said fragments and altering the appearance of said fragments.

49. The method of claim 48 further comprising, after the step of downloading the control module and prior to step (a), the step of downloading said fragments, initial positions for said fragments, and correct relative positions for said fragments from the server computer system.

50. The method of claim 49 further comprising, after the step of downloading said fragments and said positions and prior to step (a), the steps of:
 individually assigning each of said fragments to each of said initial positions;
 altering an appearance of each of said fragments to conform to its respectively assigned position within said image, thereby creating an initial configuration of the fragments within the positions of said image.

51. The method of claim 50 wherein step (d) comprises altering a size or an orientation or both of said selected fragment to conform to the predefined characteristics of said second position so that the orientation of said selected fragment is preserved with respect to a radius.

52. The method of claim 50 wherein one of said fragments is omitted prior to the displaying step, thereby creating an initial empty position.

53. The method of claim 51, wherein the selected fragment of step (b) comprises one of said plurality of outer fragments at a position adjacent to said initial empty position.

54. The method of claim 53, wherein the moving step comprises moving said selected fragment to said initial empty position, thereby creating a new empty position.

55. The method of claim 54 further comprising, after step (d), the step of displaying a new configuration of said fragments within said positions of the image.

56. The method of claim 55 further comprising the step of determining if the new configuration of said fragments correctly represents said image.

57. The method of claim 56 further comprising the step of if the new configuration correctly represents said image, then displaying said omitted fragment in said new empty position.

58. A computer system for composing an image within a computerized puzzle, the image divided into a plurality of outer fragments at predetermined positions around a center of the image, each outer fragment varying in size or orientation or both from the other outer fragments, the computer system comprising:
 a processor;
 a memory coupled to the processor, the memory maintaining the fragments, the initial positions for said fragments, the correct relative positions for said fragments, and a control module; and
 a display device coupled to the processor for displaying a configuration of the fragments;
 an input device coupled to the processor;
 the input device being operative to:
  select one of said fragments as a selected fragment, said selected fragment located within one of the positions in the image,
 the processor being operative to:
  execute instructions within the control module to control the computerized puzzle,
  move said selected fragment to a second of said positions in response to selecting said selected fragment,
  alter an appearance of said selected fragment to conform to defined characteristics of said second position.

59. The computer system of claim 58, wherein said processor is further operative to alter a size or an orientation or both of said selected fragment to conform to the defined characteristics of said second position.

60. The computer system of claim 59 further comprising a communications interface coupled to the processor, the communications interface connecting a server to the computer system; and
 wherein the processor is further operative to download said control module, said fragments, said initial positions for said fragments and said correct relative positions for said fragments from the server to memory.

61. The computer system of claim 60 wherein the processor is further operative to execute instructions within the control module to alter each of said fragments to conform to the defined characteristics of its initial position within the image; and
 wherein the processor is further operative to execute instructions within the control module to display said fragments in said initial positions prior to moving said selected fragment.

62. The computer system of claim 61 wherein the processor is further operative to execute instructions within the control module to arrange said fragments in continuous bands around a center of said image.

63. The computer system of claim 62 wherein the processor is further operative to execute instructions within the control module to vary the number of said continuous bands, thereby making it easier or more difficult to compose said image.

64. The computer system of claim 63 wherein said memory further maintains a center fragment including the center of said image; and wherein the processor is further operative to execute instructions within the control module to arrange said continuous bands around said center fragment.

65. The computer system of claim 64 wherein the processor is further operative to execute instructions within the control module to omit one of said fragments prior to displaying said fragments thereby creating an initial empty position within said image.

66. The computer system of claim 65 wherein the processor is further operative to execute instructions within the control module to move said selected fragment to said initial empty position, thereby creating a new empty position.

67. The computer system of claim 66 wherein the processor is further operative to execute instructions within the control module to select only one of a plurality of fragments adjacent to said initial empty position as said selected fragment.

68. The computer system of claim 67 wherein the processor is further operative to execute instructions within the control module to alter an appearance of said center fragment when altering an appearance of another fragment so that said center fragment has the same orientation with respect to said new empty position as it had to said initial empty position.

69. The computer system of claim 64 wherein said memory further maintains a copy of said fragments including said center fragment; and wherein the processor is further operative to execute instructions within the control module to alter only said copy of said fragment to conform to the defined characteristics of its second position within the image; and wherein the processor is further operative to execute instructions within the control module to display said copy of said fragments.

\* \* \* \* \*